United States Patent
Yoshida

(10) Patent No.: US 9,250,487 B2
(45) Date of Patent: Feb. 2, 2016

(54) LIQUID CRYSTAL DISPLAY DEVICE

(75) Inventor: Masahiro Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 224 days.

(21) Appl. No.: 14/113,628

(22) PCT Filed: Apr. 24, 2012

(86) PCT No.: PCT/JP2012/060924
§ 371 (c)(1),
(2), (4) Date: Oct. 24, 2013

(87) PCT Pub. No.: WO2012/147722
PCT Pub. Date: Nov. 1, 2012

(65) Prior Publication Data
US 2014/0049714 A1    Feb. 20, 2014

(30) Foreign Application Priority Data

Apr. 26, 2011  (JP) ................................. 2011-098129

(51) Int. Cl.
*G02F 1/1343* (2006.01)
*G02F 1/1335* (2006.01)
(Continued)

(52) U.S. Cl.
CPC ........ *G02F 1/134363* (2013.01); *G02F 1/1335* (2013.01); *G02F 1/1339* (2013.01);
(Continued)

(58) Field of Classification Search
CPC .......... G02F 1/13394; G02F 1/136209; G02F 1/136213; G02F 1/1393; G02F 1/134363
USPC ..................................................... 349/38–39
See application file for complete search history.

(56) References Cited

U.S. PATENT DOCUMENTS 7,649,601 B2    1/2010  Ikeda et al.
8,253,903 B2 *  8/2012  Irie et al. ........................ 349/129
(Continued)

FOREIGN PATENT DOCUMENTS

JP   2005-309239 A   11/2005
JP   2009-069331 A    4/2009
(Continued)

OTHER PUBLICATIONS

English translation of Official Communication issued in corresponding International Application PCT/JP2012/060924, mailed on Nov. 21, 2013.
(Continued)

*Primary Examiner* — Hoan C Nguyen
(74) *Attorney, Agent, or Firm* — Keating & Bennett, LLP

(57) ABSTRACT

A liquid crystal display device (100) includes a TFT substrate (110) including a TFT (10), an interlayer insulating layer which covers the TFT (10), a pixel electrode (12) electrically connected to the TFT (10) via a contact hole (14) formed in the interlayer insulating layer, a storage capacitor bus line (6) and a storage capacitor electrode (8) connected to the storage capacitor bus line (6), and a storage capacitor counter electrode (16) having a light-shielding property electrically connected to the TFT (10) and the pixel electrode (12), the storage capacitor counter electrode (16) constituting a storage capacitor portion together with the storage capacitor electrode (8) with an insulating layer interposed therebetween. The liquid crystal display device (100) also includes a counter substrate (120) including a counter electrode. Between the TFT substrate (110) and the counter substrate (120), a columnar spacer (24) is disposed in a center portion of a pixel region so as to at least partially overlap with the storage capacitor counter electrode. The contact hole (14) is provided so as to overlap with the storage capacitor counter electrode (16). A black matrix (20) includes a portion (20x) which integrally covers the TFT (10) and the columnar spacer (24).

12 Claims, 17 Drawing Sheets

(a)

(b)

(51) Int. Cl.
*G02F 1/1339* (2006.01)
*G02F 1/1362* (2006.01)
*G02F 1/139* (2006.01)

(52) U.S. Cl.
CPC .......... *G02F1/1393* (2013.01); *G02F 1/13394* (2013.01); *G02F 1/13624* (2013.01); *G02F 1/136209* (2013.01); *G02F 1/136213* (2013.01)

(56) References Cited

U.S. PATENT DOCUMENTS 8,400,597 B2    3/2013   Morinaga et al.
8,854,581 B2 *  10/2014  Yoshida et al. ............... 349/129
8,896,801 B2 *  11/2014  Lim et al. ...................... 349/154
2012/0307172 A1  12/2012  Yoshida

FOREIGN PATENT DOCUMENTS

WO    2009/154031 A1    12/2009
WO    2011/096390 A1    8/2011

OTHER PUBLICATIONS

Official Communication issued in International Patent Application No. PCT/JP2012/060924, mailed on Jun. 26, 2012.

* cited by examiner (a)

(b)

(a)

(b)

LIQUID CRYSTAL DISPLAY DEVICE

TECHNICAL FIELD

The present invention relates to a liquid crystal display device which operates in a VA mode.

BACKGROUND ART

As a display device such as a display device of a thin-screen television or a personal computer, or a small display device for a cellular phone or a smart phone, an active matrix liquid crystal display device which uses a thin film transistor (TFT: Thin Film Transistor) as a switching element is widely utilized. In addition to conventional TN liquid crystal display devices, other types of liquid crystal display devices such as liquid crystal display devices utilizing a VA (Vertical Alignment) mode as a vertical alignment mode or an IPS (In-Plane-Switching) mode as a horizontal electric field mode have been developed.

As a liquid crystal display device of VA mode, a liquid crystal display device of MVA (Multi-domain Vertical Alignment) mode, a liquid crystal display device of CPA (Continuous Pinwheel Alignment) mode, and the like are known. In the liquid crystal display device of MVA mode, multiple domains in which orientation directions of liquid crystal molecules are mutually different are formed in one pixel. In the liquid crystal display device of CPA mode, orientation directions of liquid crystal molecules are continuously varied around a rivet or the like formed on an electrode in the center portion of a pixel.

For example, Patent Document No. 1 describes a liquid crystal display device comprising a plurality of projecting structures in a pixel region and operating in a VA mode. The projecting structures disposed in the pixel region are utilized for regulating the orientation of liquid crystal molecules. Part of the projecting structure also functions as a columnar spacer used for maintaining a cell gap (the thickness of a liquid crystal layer).

Patent Document No. 2 describes a liquid crystal display device of MVA mode in which many minute slits (cuts) extending in directions of azimuth angles of 45°, 135°, 225°, and 315° are formed in a pixel electrode (also referred to as a comb-like pixel electrode or a fishbone-shaped pixel electrode). The azimuth angles are angles measured by regarding the three o'clock direction as 0° and regarding the anti-clockwise direction as a direction of positive angles. The liquid crystal molecules are aligned in parallel to these slits, thereby realizing four-divided domain structure. Patent Document No. 3 describes a semi-transmissive liquid crystal display device which can operate in the MVA mode.

CITATION LIST

Patent Literature

Patent Document No. 1: Japanese Laid-Open Patent Publication No. 2005-309239
Patent Document No. 2: International Publication No. WO 2009/154031
Patent Document No. 3: Japanese Laid-Open Patent Publication No. 2009-69331

SUMMARY OF INVENTION

Technical Problem

Patent Document No. 1 discloses a configuration with a projection structure functioning as a columnar spacer, the projection structure being disposed in a region in which a storage capacitor (also referred to as an auxiliary capacitor) is formed in the center portion of a pixel. The document also discloses a configuration in which a BM (black matrix) is provided on a counter substrate in a position corresponding to the columnar spacer. However, a liquid crystal display device includes a portion in which alignment disorder may occur such as a contact hole in addition to the columnar spacer. For this reason, the display quality may sometimes be degraded only by providing the BM separately with respect to the columnar spacer. In the configuration in which respective regions to be light-shielded in the pixel region (e.g. contact holes or TFTs) are dispersedly disposed, especially, it is sometimes difficult to increase the aperture ratio in the small-sized and high-definition liquid crystal display device.

The embodiment of Patent Document No. 2 describes a configuration in which a contact hole is provided in the vicinity of a switching device (TFT), and a region including the TFT and the contact hole is integrally covered with a BM on a counter substrate. However, the liquid crystal display device disclosed in Patent Document No. 2 is configured in such a manner that the columnar spacer is provided in a position which does not overlap with the pixel electrode (e.g. four corners of a pixel).

Patent Document No. 3 describes a configuration in which an auxiliary capacitor portion is formed by using a drain electrode and an auxiliary capacitor line in the vicinity of a TFT, and a contact hole is provided on the auxiliary capacitor, thereby electrically conducting the pixel electrode and the drain electrode. In this liquid crystal display device, however, since a columnar spacer is disposed in the vicinity of the boundary between a reflecting electrode and a transmission electrode in adjacent two pixels, the spacer is not disposed in the pixel region.

In the liquid crystal display devices described in Patent Document No. 2 and Patent Document No. 3, regions to be preferably light-shielded are disposed proximately, so that an increase in aperture ratio can be expected. In the case where the pixel size is relatively larger, the configuration in which the columnar spacer is not disposed in the pixel region has a small influence on the aperture ratio, even if a space for the columnar space can be ensured on the outside of the pixel electrode without affecting display. In the case of high definition and a small pixel size, it is sometimes difficult to provide a columnar spacer on the outside of the pixel region without affecting display and without reducing the aperture ratio.

In a liquid crystal display device which operates in CPA mode, or in a liquid crystal display device of VA mode which utilizes a fishbone-shaped pixel electrode, for example, a columnar spacer which also functions as an orientation regulating structure is sometimes provided in the center portion of a pixel region. In such a case, in displaying a black image, by means of a vertical alignment film on the columnar spacer, the orientation of liquid crystal molecules in the vicinity thereof is regulated. With such a configuration, if a light-shielding member is not disposed for the columnar spacer, the contrast ratio is degraded because of light leakage or the like. On the other hand, if a light-shielding member is disposed for the columnar spacer, the reduction of pixel aperture ratio (the reduction of luminance) is inevitably caused.

Particularly in a small-sized and high-definition liquid crystal display device (a device with small dot pitch), the minimum line width is defined by design rules (process rules), so that the ratio of occupation area of lines to the pixel area has a tendency to increase. For this reason, in the case where lines having light-shielding property are used, such lines may be a hindrance factor in increasing the aperture ratio or in promoting the miniaturization and high definition. Accordingly, particularly in the high-definition liquid crystal display device in which lines having light-shielding property are used for forming storage capacitors or the like, it has been desired that the aperture ratio should be more improved. Small-sized and high-definition display devices are utilized in electronic books, smart phones, and the like, and the demand thereof is further anticipated from now on.

The present invention has been conducted in order to solve the above-mentioned problems, and the objective thereof is to provide a liquid crystal display device which performs bright display with an improved contrast ratio by appropriately disposing a light-shielding region.

Solution to Problem

The liquid crystal display device according to an embodiment of the present invention is a liquid crystal display device including: a TFT substrate, a counter substrate, and a vertical alignment type liquid crystal layer sandwiched between the TFT substrate and the counter substrate, wherein the TFT substrate includes: a first substrate; a gate bus line provided so as to extend along a first direction on the first substrate; a source bus line provided so as to extend along a second direction which intersects the first direction on the first substrate; a TFT provided in the vicinity of the intersecting portion of the gate bus line and the source bus line; an interlayer insulating layer which covers the TFT; a pixel electrode electrically connected to the TFT via a contact hole formed in the interlayer insulating layer; a storage capacitor bus line provided on the first substrate and a storage capacitor electrode connected to the storage capacitor bus line; and a storage capacitor counter electrode having a light-shielding property electrically connected to the TFT and the pixel electrode, the storage capacitor counter electrode constituting a storage capacitor portion together with the storage capacitor electrode with an insulating layer interposed therebetween, and the counter substrate includes: a second substrate; and a counter electrode provided on the second substrate, and wherein the liquid crystal display device further comprises a black matrix having a light-shielding property provided on the first substrate or on the second substrate, and a columnar spacer provided between the TFT substrate and the counter substrate, the columnar spacer being disposed in a center portion of a pixel region corresponding to the pixel electrode so as to at least partially overlap with the storage capacitor counter electrode, the contact hole being provided so as to overlap with the storage capacitor counter electrode, and the black matrix including a portion which integrally covers the TFT and the columnar spacer.

In one embodiment, the source bus line is disposed so as to extend along a peripheral portion of the pixel region, and the TFT is disposed in the vicinity of the peripheral portion of the pixel region.

In one embodiment, the columnar spacer is disposed so as to at least partially overlap with the pixel electrode.

In one embodiment, the black matrix is disposed so as to at least partially overlap with the storage capacitor counter electrode.

In one embodiment, the black matrix includes a first BM portion for light-shielding the TFT and a second BM portion for light-shielding the columnar spacer, the first BM portion overlapping with the second BM portion.

In one embodiment, the contact hole and the columnar spacer are disposed so as to at least partially overlap with each other.

In one embodiment, the orientation of liquid crystal molecules of the liquid crystal layer is radially regulated by the columnar spacer when a voltage is applied.

In one embodiment, the pixel electrode includes a plurality of first minute electrodes extending in a third direction, a plurality of second minute electrodes extending in a fourth direction, a plurality of third minute electrodes extending in a fifth direction, and a plurality of fourth minute electrodes extending in a sixth direction, the third direction, the fourth direction, the fifth direction, and the sixth direction being mutually different.

In one embodiment, the pixel electrode includes a backbone portion formed in a boundary portion of the first to fourth minute electrodes, and an additional storage capacitor is formed in a region corresponding to the backbone portion.

In one embodiment, the liquid crystal display device includes a plurality of pixel regions, and a projection structure which is lower than the columnar spacer is provided in the center portion of a pixel region which is different from the pixel region in which the columnar spacer is provided among the plurality of pixel regions.

In one embodiment, the liquid crystal display device further includes a sub pixel electrode disposed adjacently to the pixel electrode, and connected to the TFT via a capacitance coupling.

In one embodiment, the liquid crystal display device includes a plurality of pixel regions, and the position of the contact hole with respect to the columnar spacer is different between at least two pixel regions among the plurality of pixel regions.

Advantageous Effects of Invention

According to the embodiments of the present invention, it is possible to improve the display characteristics of a vertical alignment type liquid crystal display device which operates in a VA mode.

DESCRIPTION OF EMBODIMENTS

A liquid crystal display device according to the embodiments of the present invention is a liquid crystal display device which includes a columnar spacer in a pixel region and operates in a VA mode (for example, a CPA mode or an MVA mode). In the liquid crystal display device, a region of which the contribution to display is low in the vicinity of the columnar spacer and a region to be light-shielded such as a TFT are covered with a BM, and a storage capacitor forming region is formed so as to have a light-shielding property. In addition, a contact hole is disposed in this region, thereby preventing the display quality from being degraded. These light-shielding regions are typically disposed in an appropriate manner without being dispersed in a region including the center portion of the pixel, thereby improving an aperture ratio. In the case of the operation in the CPA mode, the columnar spacer disposed in the pixel region can be positively utilized as an orientation regulating structure of liquid crystal molecules.

Figure 16:
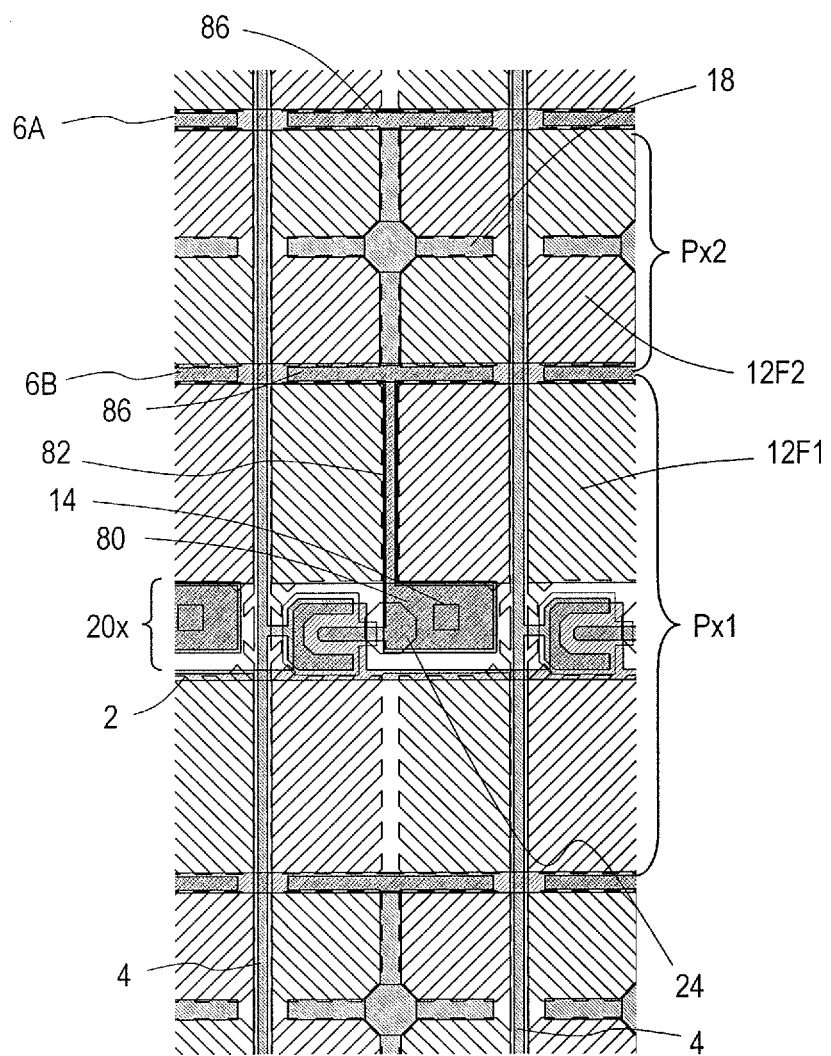
FIG. 16 is an enlarged view showing the center portion of a pixel in the liquid crystal display device shown in FIG. 15.

The technique related to such a liquid crystal display device is disclosed by the inventors of the present invention in International Publication No. WO 2011/096390. FIG. 16 and other figures of International Publication No. WO 2011/096390 show the configuration in which a columnar spacer is disposed in the center portion of a pixel, and the columnar spacer, a TFT, and a contact hole are integrally covered with a BM. In this liquid crystal display device, however, a storage capacitor to be formed in the pixel region is not formed by an electrode with light-shielding property, but formed by using a transparent electrode. International Publication No. WO 2011/096390 also discloses the configuration in which the storage capacitor is formed by an electrode with light-shielding property, but in such a case, the storage capacitor is formed not in the pixel region but by utilizing a gap between pixels. In addition, a source bus line is provided along a backbone portion of a fishbone electrode (along a line for dividing the pixel region into two parts), and a TFT is disposed in the center portion of the pixel. Such a configuration is described to be applied to the case of a pixel size of approximately 100 μm×300 μm, for example.

On the other hand, in the embodiments of the present invention, typically, an electrode formed from the same material as that of a gate bus line and an electrode formed from the same material as that of a source bus line are used, thereby forming a storage capacitor with an insulating film of the same material as that of the gate insulating film interposed between the electrodes. With such a configuration, it is unnecessary to additionally provide a transparent electrode for forming a storage capacitor and an insulating film between the transparent electrode and the pixel electrode, so as to be advantageous in the production process and the production cost. In the embodiments of the present invention, a storage capacitor portion formed by using a material with light-shielding property is arranged so as to overlap with the contact hole, so that the alignment disorder region of liquid crystal molecules occurring in the contact hole portion and around the portion can be efficiently light-shielded. In this configuration, it is not necessary to ensure a margin in view of the displacement in laminating substrates, as compared with the case where the alignment disorder region of the contact hole portion is light-shielded by the BM. As the margin for the displacement in laminating substrates, about 5 μm is required, for example. Accordingly, in the case of a smaller pixel size (for example, 50 μm×150 μm), the configuration of the present invention is also preferable.

In addition, in the present invention, the above of a source bus line is not covered with a transparent electrode for forming a storage capacitor. Accordingly, the load of the source bus line is low, and the present invention is suitable for mobile equipment for which the reduction of power consumption is required.

Hereinafter, the embodiments of the present invention will be described with reference to the accompanying drawings, but the present invention is not limited to these embodiments.

Embodiment 1

FIG. 1(a) and FIG. 1(b) show the configuration of a liquid crystal display device 100 according to Embodiment 1 of the present invention. FIG. 1(a) mainly shows the components on a TFT substrate (an active matrix substrate) 110 in the liquid crystal display device 100. FIG. 1(b) mainly shows the components on a counter substrate 120. In the liquid crystal display device 100, between the TFT substrate 110 and the counter substrate 120, a vertical alignment type liquid crystal layer formed by using a liquid crystal material having negative dielectric anisotropy ($\Delta \epsilon < 0$) is sandwiched. The orientation of liquid crystal molecules is regulated so that the liquid crystal molecules have a tilt angle closer to 90° (for example, equal to or more then 85° and less than 90°) in no voltage application by a vertical alignment film (not shown) disposed on the side of the liquid crystal layer of respective substrate. The liquid crystal display device 100 with the above-described configuration operates in a VA mode. Although not shown in the figure, a polarizing plate is disposed on the outer side of each of the TFT substrate 110 and the counter substrate 120, and a backlight unit is provided on the outer side of the TFT substrate 110. Between each of the polarizing plates and the liquid crystal layer, a ¼ wavelength plate may sometimes be disposed.

In the liquid crystal display device 100 of this embodiment, the size of a pixel (dot) is set to be 50 μm×150 μm (the diagonal of about 4.7 inches of VGA system). In this specification, the term "pixel (dot)" indicates the minimum unit of monochromatic display, and a picture element which can perform full-color display can be obtained by three dots of RGB (red, green, and blue), for example.

As shown in FIG. 1(a), on the TFT substrate 110, a plurality of gate bus lines 2 extending in an X direction (in a first direction) and a plurality of source bus lines 4 extending in a Y direction (in a second direction) are disposed so as to be orthogonal to each other. In the vicinity of the crossing point of the gate bus line 2 and the source bus line 4, a TFT 10 as an active element is formed for each pixel.

The TFT 10 is constituted, as shown in FIG. 2(a), by a gate electrode 10G formed integrally with the gate bus line 2, a source electrode 10S formed integrally with the source bus line 4, a drain electrode 10D which becomes electrically conductive with the source electrode 10S when an ON voltage is applied to the gate electrode 10G, and the like. In general, between the source electrode 10S and the drain electrode 10D, a semiconductor layer is provided so as to be opposite to the gate electrode 10G via a gate insulating film.

In addition, as shown in FIG. 1(a), the TFT substrate 110 includes a storage capacitor bus line (a Cs bus line) 6 and a storage capacitor electrode (a Cs electrode) 8, and a storage capacitor counter electrode (a Cs counter electrode) 16 connected to the drain electrode 10D (shown in FIG. 2) of the TFT 10 and a pixel electrode 12. On the pixel electrode 12, a vertical alignment film (not shown) for maintaining the pretilt angle of liquid crystal molecules to be closer to 90° (in no voltage application) is provided.

The storage capacitor counter electrode 16 is provided so as to be overlapped with the storage capacitor electrode 8 in the same layer as the source/drain layer of the TFT 10 via an insulating layer such as a gate insulating film. The storage capacitor electrode 8 and the storage capacitor counter electrode 16 are opposite to each other via the insulating film (for example, a gate insulating film), thereby constituting a storage capacitor portion 80 (see FIG. 2). The drain electrode 10D of the TFT 10 and the pixel electrode 12 are electrically connected via a contact hole 14 provided in an interlayer insulating layer (not shown) located on the TFT 10. FIG. 1(a) also shows the position of a columnar spacer 24 provided on the counter substrate 120.

As shown in FIG. 1(b), the counter substrate 120 includes a black matrix (BM) 20 having an opening portion 22 provided on a transparent substrate, a counter electrode (not shown), and the columnar space 24 provided on the counter electrode. For performing color display, color filters 22R, 22G, and 22B of R (red), G (green), and B (blue), for example, are provided in a region corresponding to the opening portion 22. It is noted that an alternative configuration in which the color filters are provided on the side of the TFT substrate 110 (so-called color filter on TFT) may be adopted. In addition, a vertical alignment film is provided on the side of the liquid crystal layer of the counter substrate 120.

The columnar spacer 24 has a function of maintaining the gap between the TFT substrate 110 and the counter substrate 120 (a cell gap). In this embodiment, the columnar spacer 24 also has a function as a structure for regulating the orientation of liquid crystal molecules, and one columnar spacer 24 is provided for each of all pixels. The cross-sectional shape of the columnar spacer 24 (the projected shape onto a substrate surface when viewed from a normal direction of the substrate surface) is not limited to a regular octagon which is shown in the figure, but may be any other type of polygon, or may alternatively be a circle, an ellipse, or the like. It is preferred that the columnar spacer 24 may have a frustum shape, and that the area of the upper bottom surface (on the side of the TFT substrate 110) may be smaller than the area of the lower bottom surface (on the side of the counter substrate 120). In other words, it is preferred that the angle formed by the surface of the counter substrate 120 and the side face of the columnar spacer 24 may be smaller than 90 degrees.

As is seen from FIG. 1(a) and FIG. 1(b), in this embodiment, in each pixel region Px, the columnar spacer 24 is provided substantially in the center position thereof. Due to the orientation regulating force of the columnar spacer 24, in each pixel, liquid crystal molecules are oriented radially around the columnar spacer 24 in the application of voltage. In other words, the liquid crystal display device 100 of this embodiment operates in the CPA mode.

In addition, the TFT 10, the storage capacitor electrode 8 and the storage capacitor counter electrode 16 (a portion in which the storage capacitor electrode 8 and the storage capacitor counter electrode 16 are overlapped when viewed from the normal direction of the substrate surface is referred to as a storage capacitor portion 80), and the contact hole 14 are collectively arranged so as to be proximate to each other in the center portion of the pixel region. As described above, the columnar spacer 24 on the counter substrate 120 is also disposed in the center portion of the pixel region Px, and is partially overlapped with the storage capacitor counter electrode 16. In such a configuration, a portion 20x which is continuously formed in the BM 20 is overlapped with all of the TFT 10/the Cs electrode (the storage capacitor electrode) 8/the Cs counter electrode (the storage capacitor counter electrode) 16/the contact hole 14/the columnar spacer 24 in the plan view (when viewed from the normal direction of the substrate surface).

Hereinafter, a light-shielding region of the liquid crystal display device 100 will be described. In the liquid crystal display device 100, the following light-shielding regions (a) to (d) are provided.

(a) a BM region required for light-shielding the columnar spacer 24: It is preferred to light-shield the region up to the outside of 2 μm to 4 μm (about 3.0 μm in this embodiment) from the columnar spacer 24, for example, in view of the deviation of alignment and the variation of line width when the columnar spacer 24 is formed on the BM 20 of the counter substrate 120. The diameter of the lower bottom surface of the columnar spacer 24 (the distance between opposite two sides in the case of octagon) is set to be about 15 μm.

(b) a BM region required for light-shielding the TFT 10: When a channel portion of the TFT 10 is irradiated with light, the characteristic change (for example, the change in magnitude of leakage current in the OFF condition) occurs. Accordingly, it is preferred that the channel portion is light-shielded by the BM. For example, in the case where the cell gap is set to be 3 μm, in view of the existence of light incident in the orthogonal direction with respect to the normal direction of the substrate surface and the occurrence of displacement in bonding the counter substrate, it is necessary to provide a region of about 7 to 15 μm from the channel region as the BM region (about 7.5 μm in this embodiment). Especially, in the on vehicle use, the outdoor use, or the like, since the device is used under the environment in which the light from outside is easily incident in the orthogonal direction, it is preferred that the BM region is ensured to be larger.

(c) Storage capacitor forming region: In this embodiment, an electrode which constitutes a storage capacitor has the light shielding property. The storage capacitor forming region (the storage capacitor portion) 80 is a region which does not contribute to display in the case where the display device is of a transmission type. A storage capacitor can be alternatively formed by providing a transparent electrode under the pixel electrode via an insulating film. However, a region corresponding to the thus-formed storage capacitor is not included in the light-shielding storage capacitor forming region 80 described herein.

In the environment of outdoor use, light from outside may sometimes be reflected from the Cs electrode 8 or the Cs counter electrode 16, thereby causing color unevenness to occur. For this reason, it is preferred that the BM 20 may be disposed in the storage capacitor forming region in view of the display quality.

(d) Contact hole region: For example, an interlayer insulating film (an acrylic photosensitive resin film or the like) of about 3 μm is disposed between the drain electrode (or the storage capacitor counter electrode) and the pixel electrode, and the pixel electrode is formed thereon. With such a configuration, in the contact hole 14 (for example, a square shape having a side of about 7.5 μm) and the surrounding portion thereof, light leakage may easily occur due to liquid crystal alignment disorder in the inclined portion of the interlayer insulating film. In this embodiment, the contact hole 14 is formed on the storage capacitor portion 80, so as to light-shield the alignment disorder region.

The above-mentioned regions (a) to (d) are considered to be regions of which the contribution to display is low (or which do not contribute to display). That is, it is preferred that light from these regions may not be observed, and the region is desired to be light-shielded by the BM or to have the light-shielding property.

The light-shielding storage capacitor portion 80 is formed in the following manner, for example. First, in the step of providing a gate bus line and a gate electrode, by using the same material as that of the gate bus line or the like (e.g., an Al film, a Cu film, an Mo film, a Ti film, a Cr film, or the like, or an alloy film thereof, or a multi-layer metal film (a Ti—Al—Ti film or an Mo—Al film), a storage capacitor storage bus line and a storage capacitor electrode are formed. Next, a gate insulating film is provided so as to cover the storage capacitor electrode. Thereafter, in the step of forming a source bus line and a drain electrode, by using the same material as that of the source bus line or the like (e.g., an Al film, a Cu film, an Mo film, a Ti film, a Cr film, or the like, or an alloy film thereof, or a multi-layer metal film (an Mo—Al—Mo film or a Ti—Al film), a storage capacitor counter electrode is formed so as to be opposite to the storage capacitor electrode on the gate insulating film. A storage capacitor portion 80 is obtained by the storage capacitor electrode and the storage capacitor counter electrode which are oppositely arranged via a gate insulating film (for example, an SiNx film or the like having the thickness of about 0.3 to 0.7 μm).

In the above-described configuration, the light-shielding region of which the contribution to display is low is put in the center portion of the pixel. Accordingly, it is possible to more efficiently perform the light shielding, as compared with the case where these regions are dispersed. These regions are disposed so as to be proximate to each other, it is possible to improve the aperture ratio of a pixel while the occurrence of light leakage is suppressed and the contrast ratio is improved.

Figure 1:
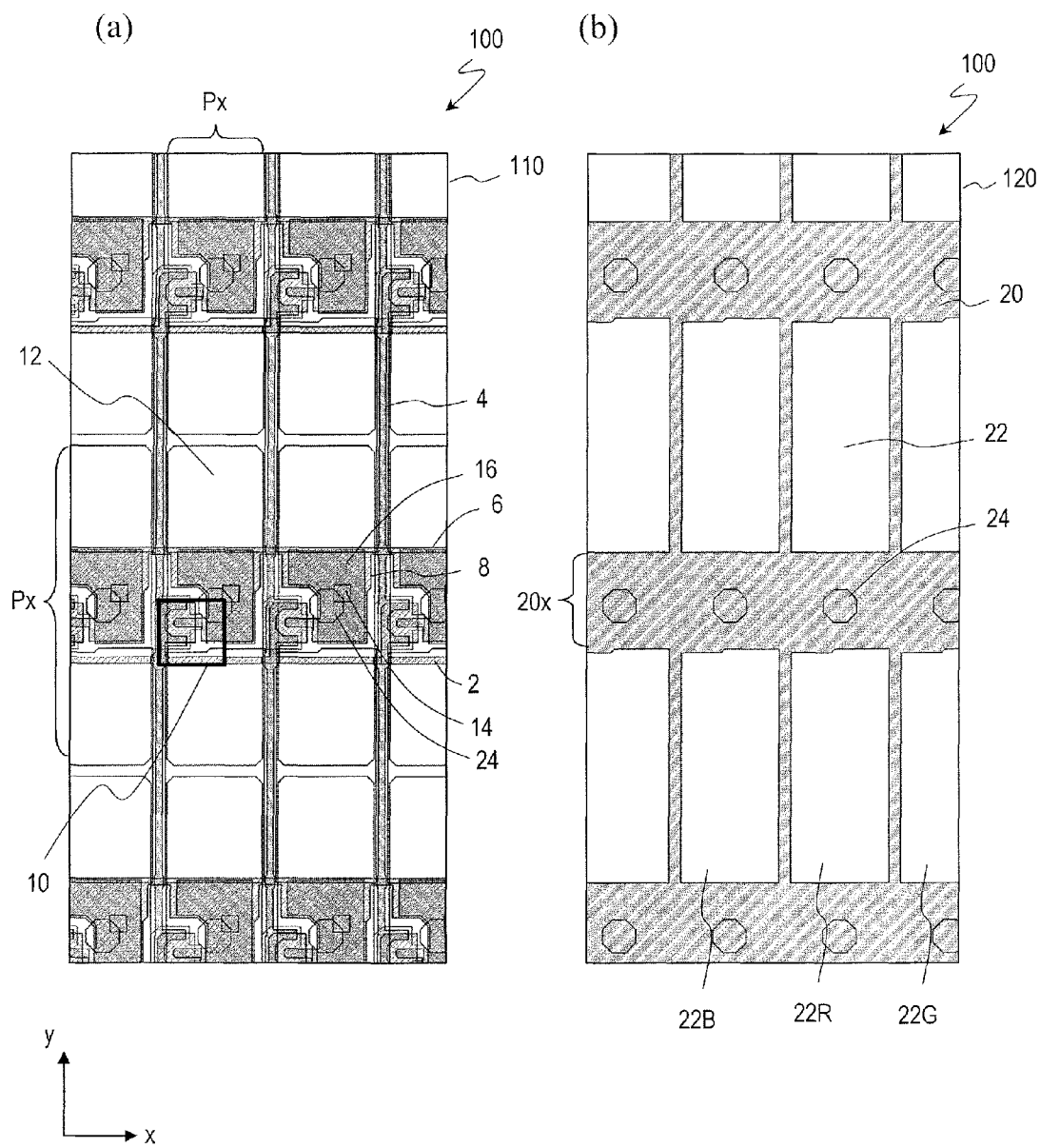
FIG. 1 is a plan view showing the configuration of a liquid crystal display device according to Embodiment 1 of the present invention, in which (a) emphatically shows the components on a TFT substrate, and (b) emphatically shows the components on a counter substrate.
Figure 2:
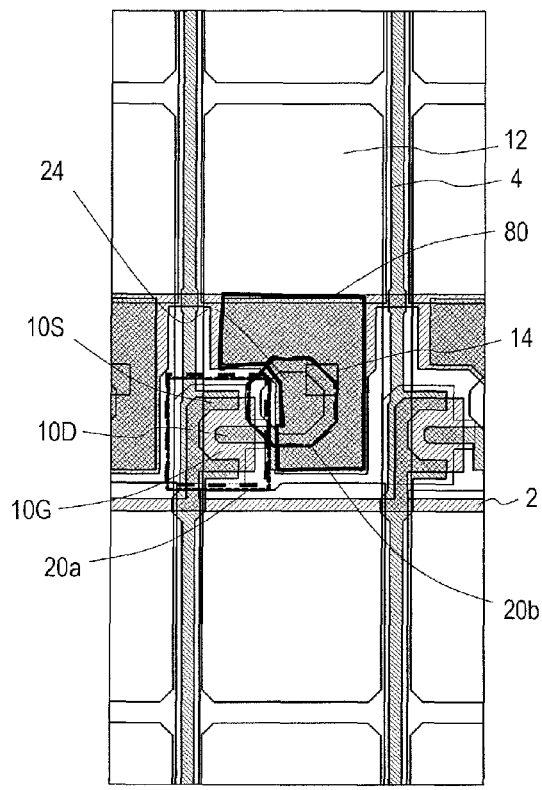
FIGS. 2 (a) and (b) are enlarged views showing the center portion of a pixel in FIG. 1(a).
Figure 2:
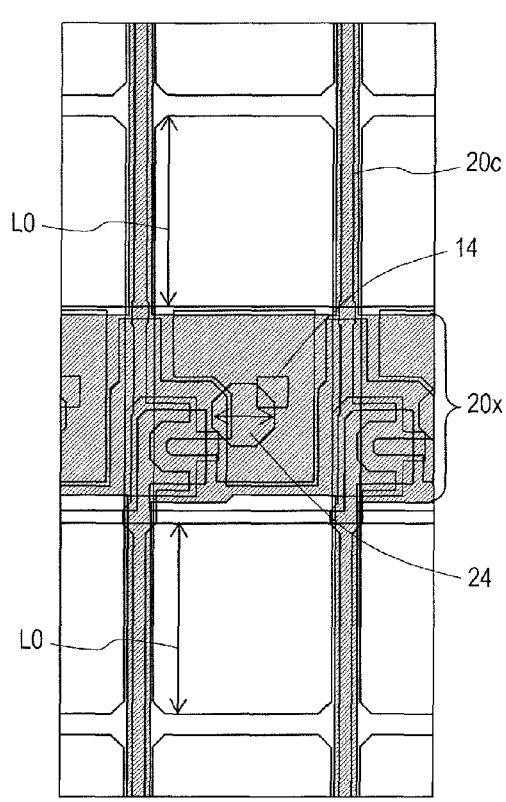

As described above, FIG. 2 shows the center portion of the pixel region of the TFT substrate 110 shown in FIG. 1 in an enlarged manner. FIG. 2 also shows the position of the columnar spacer 24 provided on the counter substrate 120. The final position of the columnar spacer 24 in the TFT 10 is determined in the step of sticking the TFT substrate 110 and the counter substrate 120 together.

In the counter substrate 120, a partial region of the BM 20 required for light-shielding the TFT 10 is indicated as a region 20a. A partial region of the BM 20 which covers the columnar spacer 24 and the surrounding thereof is indicated as a region 20b. As is seen from the figure, in this embodiment, these regions 20a and 20b overlap each other. This does not mean that these regions are separately provided actually so as to overlap each other, but means that the respective regions 20a and 20b defined in the BM 20 have the above-described overlap relationship.

As is seen from the figure, in this embodiment, the storage capacitor portion 80 and the region 20b are arranged to overlap each other. Such an arrangement is realized by providing the storage capacitor portion 80 in the vicinity of the TFT 10 and providing the columnar spacer 24 in the position corresponding to the storage capacitor portion 80 in the counter substrate 120, and by locating the BM 20 so as to cover at least the entire of the columnar spacer 24 and the entire of the TFT 10.

In addition, a BM 20c on the source bus line 4 shown in FIG. 2(b) is provided for the purpose of avoiding colors from mixing when sticking displacement is caused between the TFT substrate 110 and the counter substrate 120. The provision of the BM 20c additionally provides the following advantage. Specifically, in a portion away from the columnar spacer 24 as the orientation regulating structure (an end portion of the pixel region), the response of liquid crystal is inferior, so that afterimage may easily occur. Accordingly, the covering of the portion with the BM 20c also provides the countermeasure for afterimage. In this embodiment, in order to form the BM pattern with high yield, the BM 20c on the source bus line and a BM integral portion 20x including the BM 20a and the BM 20b of the region (a) and the region (b) are continuously (integrally) formed.

In this embodiment, on the counter substrate 120, opening portions 22 disposed in upper and lower positions with the BM integral portion 20x sandwiched therebetween for one pixel region Px (i.e., portions which are not covered with the BM 20, and in which color filters are located) are provided. A portion in which the opening portion 22 and the pixel electrode 12 overlap each other is defined as a display area in one pixel. These display areas disposed in the upper and lower positions of the BM integral portion 20x are formed so as to have substantially the same size. The columnar spacer 24 is disposed substantially in the center portion of the pixel electrode 12. With such a configuration, the viewing characteristics in the vertical direction in the figure can be made uniform.

As shown in the figure, the contact hole 14 is also disposed in the pixel center portion. In this embodiment, the position of the columnar spacer 24 and the position of the contact hole 14 overlap each other. In such an arrangement, preferably, the size of the contact hole 14 is not too large with respect to the size of the columnar spacer 24, but is preferably smaller than the size of the columnar spacer 24. If the size of the contact hole 14 is too large, the columnar spacer 24 is fallen into the inside of the contact hole 14, so that the columnar spacer 24 may not function as the spacer for maintaining the cell gap. In this embodiment, the contact hole 14 is set to have a substantially square shape in section having the size of 7.5 μm×7.5 μm (the shape of the contact hole in the substrate plane). The sectional shape of the lower bottom surface of the columnar spacer 24 functioning as the orientation regulating structure/ the spacer is set to be a regular octagon in which the distance between opposite two sides is 15 µm.

Next, with reference to FIG. 3(a) and FIG. 3(b), the configuration of a liquid crystal display device 100A as a modified example of Embodiment 1 will be described.

Figure 3:
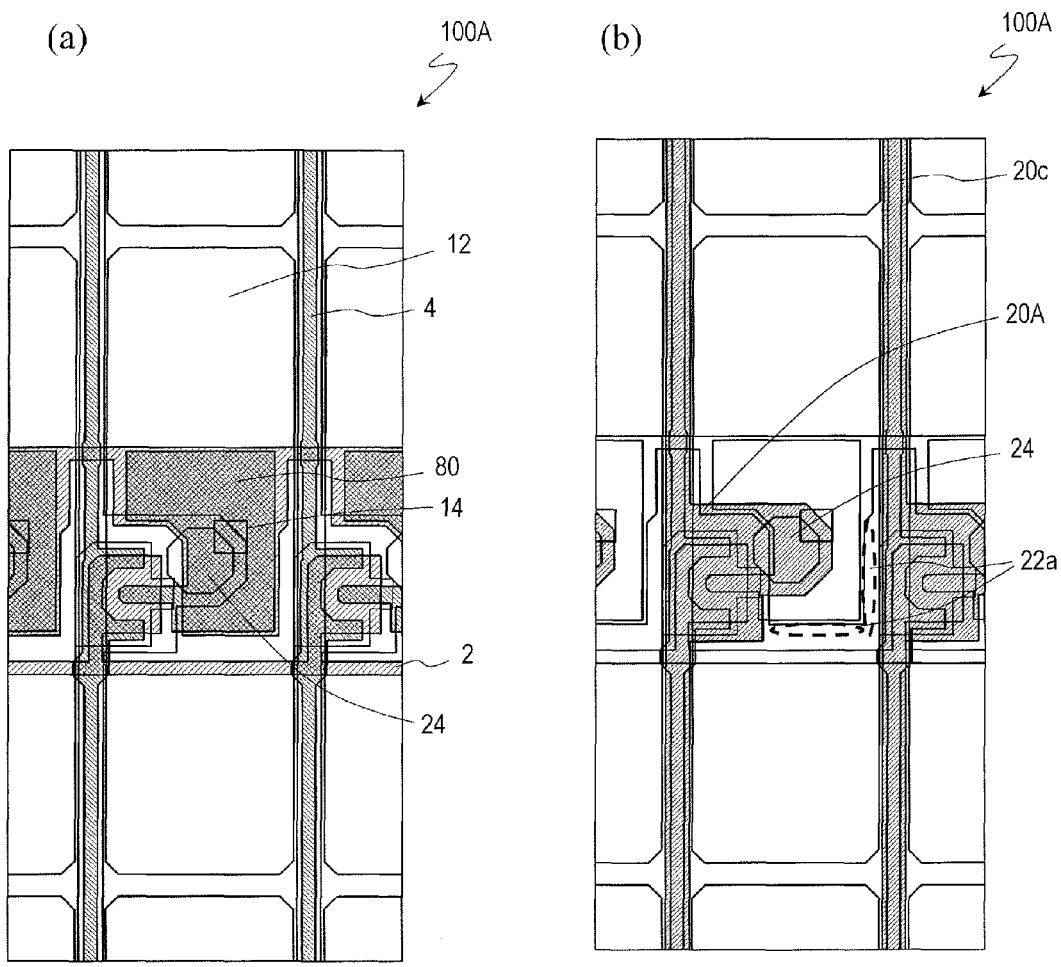
FIG. 3 is a plan view showing the configuration of a liquid crystal display device according to a modified embodiment of Embodiment 1, in which (a) emphatically shows a TFT and a storage capacitor portion on a TFT substrate, and (b) emphatically shows a BM on a counter substrate.

As shown in FIG. 3(a) and FIG. 3(b), in the liquid crystal display device 100A, a BM 20A is disposed so as to selectively and integrally cover a TFT 10 and a columnar spacer 24. Unlike the configuration shown in FIG. 1(a) and FIG. 1(b), the BM 20A does not cover the entire of a storage capacitor portion 80. The BM 20A only partially covers a contact hole 14. In other words, as compared with the liquid crystal display device 100 shown in FIG. 1 and FIG. 2, the area of BM is reduced in the liquid crystal display device 100A.

Also in the liquid crystal display device 100A in this modified embodiment, it is possible to obtain display with high aperture ratio (high luminance) and high contrast ratio by commonly providing the above-described regions (a) to (d) of which the contribution to display is low (or which do not contribute to display) or by disposing them proximately to each other. As shown as an additional opening portion 22a in FIG. 3(b), the opening portion of the pixel is increased as a whole, so that it is possible to perform display with higher luminance. It is noted that since the storage capacitor portion 80 has the light-shielding property as described above, the display quality will not be degraded due to the alignment disorder caused in the contact hole 14 and the surrounding portion thereof.

Figure 4:
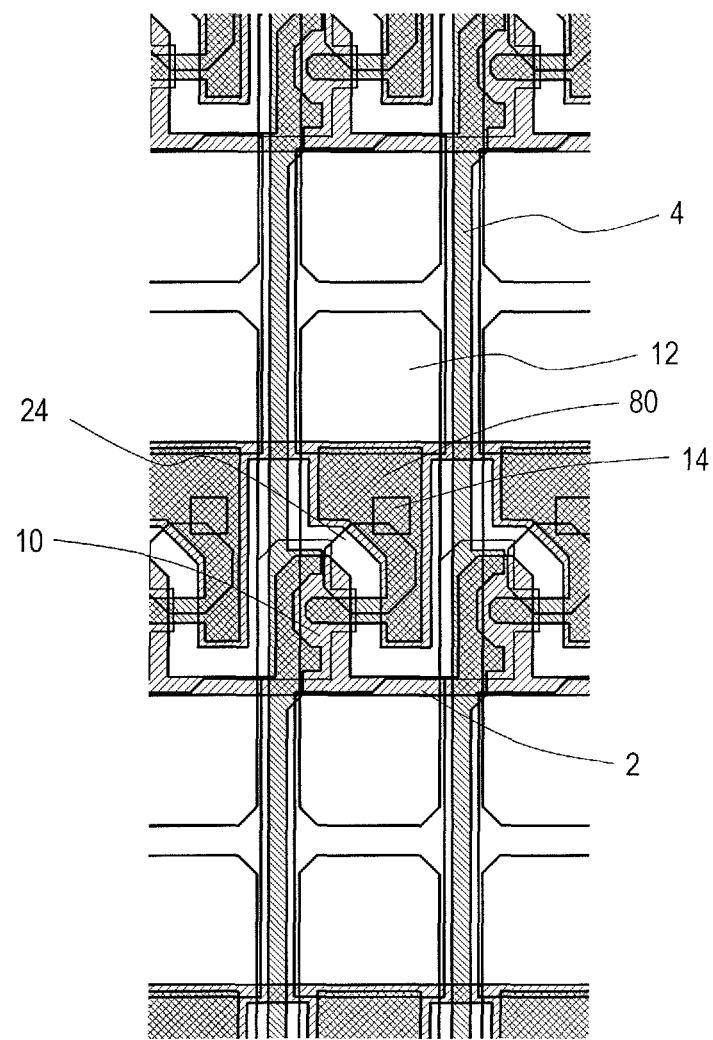
FIG. 4 is a plan view showing the configuration of a liquid crystal display device in a modified embodiment of Embodiment 1, and showing the case of a smaller pixel size.

FIG. 4 shows the configuration in which the liquid crystal display device shown in FIG. 1 (the VGA system having the pixel size (dot pitch) of 50 µm×150 µm) is applied to a high-definition liquid crystal display device having a smaller pixel size. The configuration shown in FIG. 4 is the case applied to the wide XGA system having the pixel size of 30 µm×90 µm (1280×RGB×800 pixels, and the diagonal of about 5.35 inches).

In this case, on the TFT substrate 110, the TFT 10, the storage capacitor portion 80, and the contact hole 14 are disposed proximately to each other, and the columnar spacer 24 provided on the counter substrate 120 is formed in a position so as to overlap with them, so that it is possible to provide a BM which can integrally cover entirely the region which does not contribute to display and preferably be light-shielded. Accordingly, the degradation of contrast ratio caused by light leakage can be prevented, and the aperture ratio can be improved.

In the above-described embodiment, the configuration in which the columnar spacer 24 is provided on the side of the counter substrate 120 is described. Alternatively, the columnar spacer 24 may be provided on the side of the TFT substrate 110.

Embodiment 2

Figure 5:
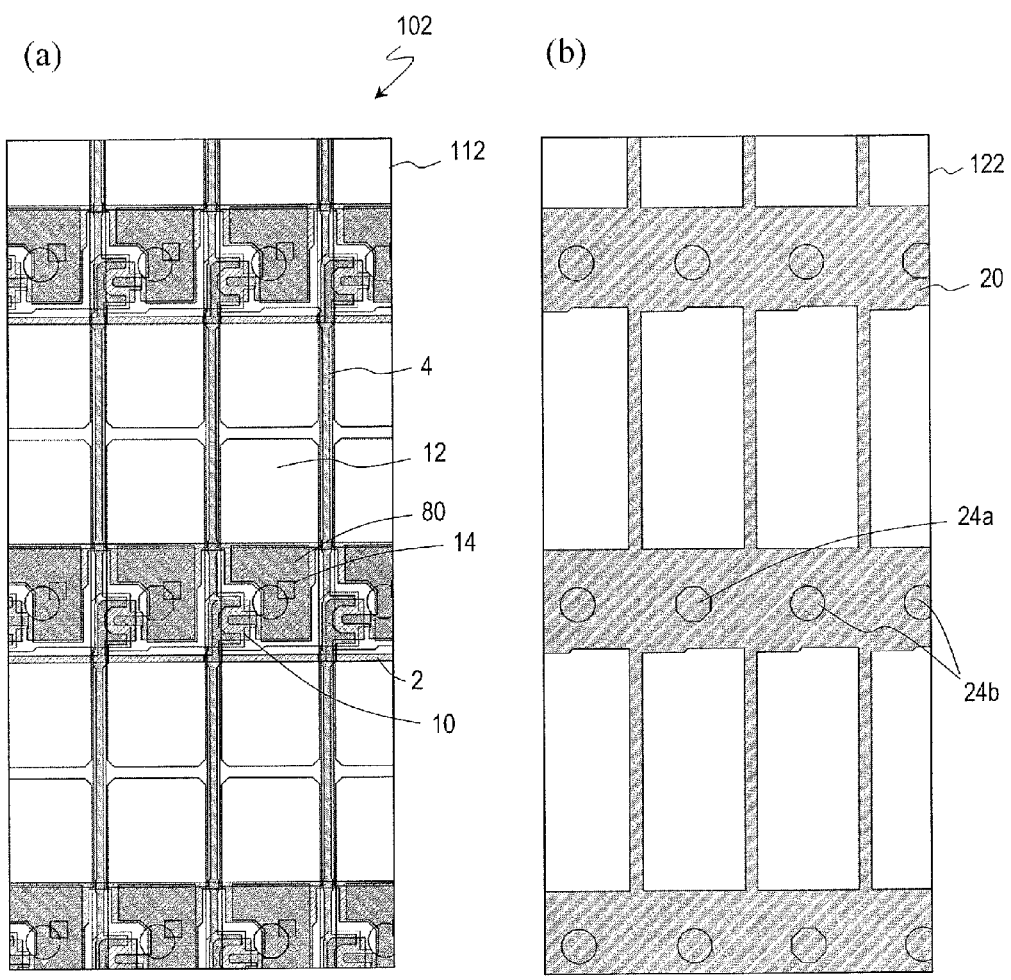
FIG. 5 is a plan view showing the configuration of a liquid crystal display device according to Embodiment 2 of the present invention, in which (a) emphatically shows the components on a TFT substrate, and (b) emphatically shows the components on a counter substrate.
Figure 6:
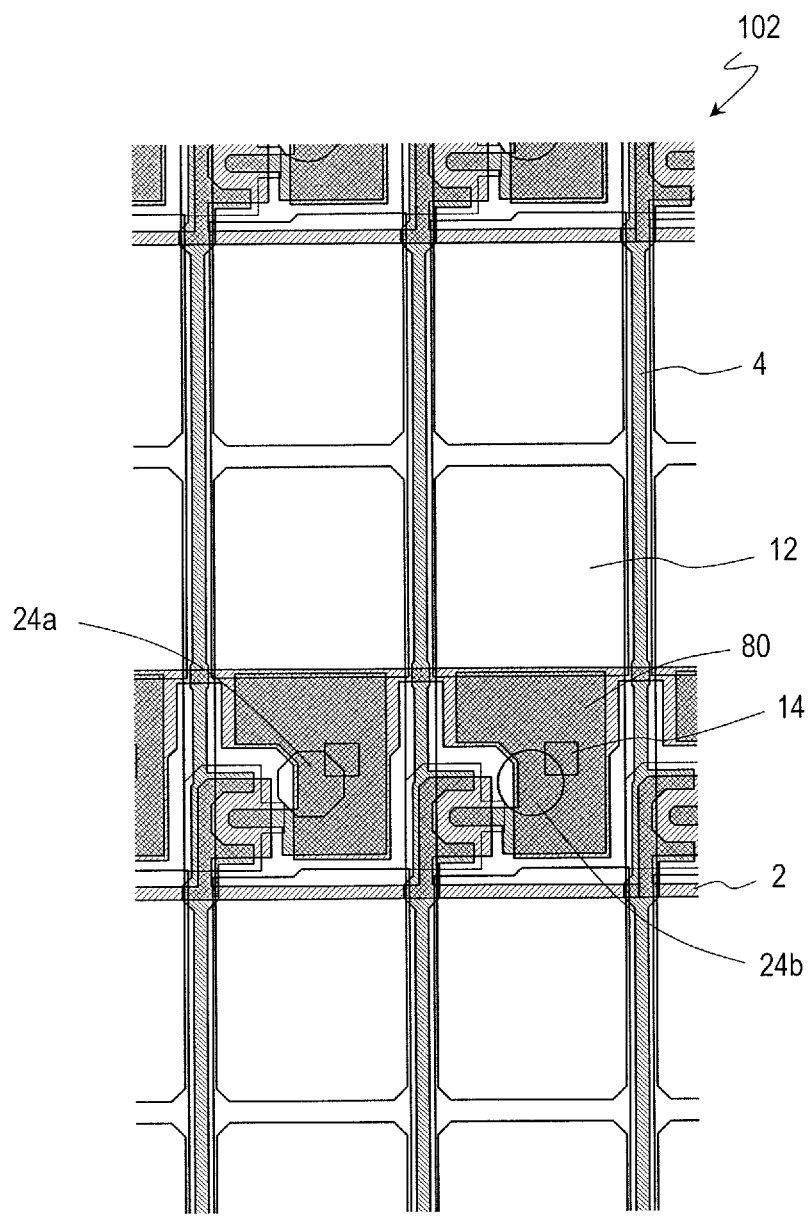
FIG. 6 is an enlarged view showing the center portion of a pixel in FIG. 5.

FIG. 5(a) and FIG. 5(b) show a liquid crystal display device 102 of Embodiment 2. FIG. 6 shows the center portion of a pixel region in FIG. 5(a) and FIG. 5(b) in an enlarged manner. The same components as those in Embodiment 1 are designated by the same reference numerals, and the descriptions thereof are omitted.

In this embodiment, on a counter substrate 122, a columnar spacer 24a (a pattern of octagon shown in FIG. 5 and FIG. 6), and a sub columnar spacer 24b (a pattern of circle shown in FIG. 5 and FIG. 6) which is formed to be lower than the columnar spacer 24a are provided.

In the liquid crystal display device 100 of Embodiment 1 shown in FIG. 1, one kind of columnar spacer 24 is disposed for each of all pixels. In Embodiment 2, in part of the pixel, the sub columnar spacer 24b is disposed instead of the columnar spacer 24a. The sub columnar spacer 24b is formed on a BM and a counter electrode of the counter substrate 122, similarly to the columnar spacer 24a. However, as compared with the columnar spacer 24a, the height of the sub columnar spacer 24b is shorter. Therefore, in such cases where any pressure is applied from the outside, the top end portion thereof comes into contact with the TFT substrate 112. For example, the height of the columnar spacer 24a is set to be 3.0±0.2 µm, and the height of the sub columnar spacer 24b is set to be 2.7±0.2 µm.

In addition to the sub columnar spacer 24b, a projection (hereinafter referred to as "a rivet") which has a height shorter than the sub columnar spacer 24b may be included. The rivet has only the orientation regulating function, and does not substantially contribute to the maintaining of the cell thickness. The height of the rivet is set to be, for example, 0.8±0.2 µm.

Alternatively, the sub columnar spacer 24b is not provided, but only the columnar spacer 24a and the rivet may be disposed on the counter substrate 122. The shapes of the columnar spacer 24a, the sub columnar spacer 24b, and the rivet in plan view may be the same, or may be different. Alternatively, the diameters of the columnar spacer 24a, the sub columnar spacer 24b, and the rivet in plan view may be the same, or may be different.

The dielectric constants of the sub columnar spacer 24b and the rivet are preferred to be smaller than that of liquid crystal. The reason is that the tilt direction of liquid crystal molecules promoted in accordance with the shape of the side face of the spacer or the rivet and the direction in which the electric field causes the liquid crystal to tilt will not be opposite to each other.

As described above, some of the columnar spacers 24a may be replaced by the sub columnar spacers 24b or the rivets having shorter heights, thereby reducing the occurrence of air bubbles in the liquid crystal layer when the temperature changes.

For example, in the case where the liquid crystal panel is stored at a low temperature (e.g. −30° C.), vacuum bubbles may sometimes occur because of the difference between the contraction rate of liquid crystal and the contraction rate of other members (in this case, the columnar spacer). Particularly in the case of the high-definition liquid crystal display device, if the columnar spacers 24a are disposed for every pixel, the number of columnar spacers to be provided is equal to or larger than the required number for maintaining the cell thickness. As a result, the risk of bubble occurrence may undesirably be increased. In such a case, some of the columnar spacers 24a may be changed to the rivets or the sub columnar spacers 24b having smaller volumes, thereby adequately adjusting the arrangement density.

Especially in the small-sized and high-definition liquid crystal display device, it may sometimes be sufficient that the number of spacers required for maintaining the cell gap be smaller than the number of pixels. The configuration of this embodiment can suitably be used for such a case.

As for the arranging formation of the columnar spacers 24a and the sub columnar spacers 24b, for example, the columnar spacers 24a may be disposed for all of the B (blue) pixels, and the sub columnar spacers 24b may be disposed for other pixels (the R (red) pixels and the G (green) pixels). Alternatively, for example, the columnar spacers 24a may be disposed for four B pixels among twenty seven pixels, the sub columnar spacers 24b may be disposed for five B pixels among the twenty seven pixels, and the rivets may be disposed for eighteen pixels of the other colors (R and G). Since the B pixels have low transmittance, the degradation of display quality caused by the alignment disorder is hard to be observed even if the columnar spacers 24a are disposed. Accordingly, it is preferred that the columnar spacers 24a may be disposed for the B pixels.

The sub columnar spacers 24b are, for example, suitably used as cell thickness maintaining members when a touch panel or the like is provided on the surface of a liquid crystal panel. Alternatively, if the sub columnar spacers 24b and the rivets are used instead of the columnar spacers 24a, in the case where the liquid crystal injection is performed by ODF (One Drop Filling) in the manufacture of liquid crystal cell, the dropped liquid crystal can be advantageously dispersed more uniformly.

In the configuration with smaller dot pitch as shown in FIG. 4, the configuration in which the columnar spacers and rivets having different heights as described in Embodiment 2 can be applied.

As described above, in the case where the columnar spacers 24a are not provided for all of the pixels, it is sufficient to arrange the columnar spacers 24a so that the arrangement density is uniform over the entire display area of the liquid crystal panel. With such a configuration, the rivets or the like for orientation regulation disposed instead of the columnar spacers 24a can have any arbitrary shape which is more suitable for orientation regulation.

Embodiment 3

Figure 7:
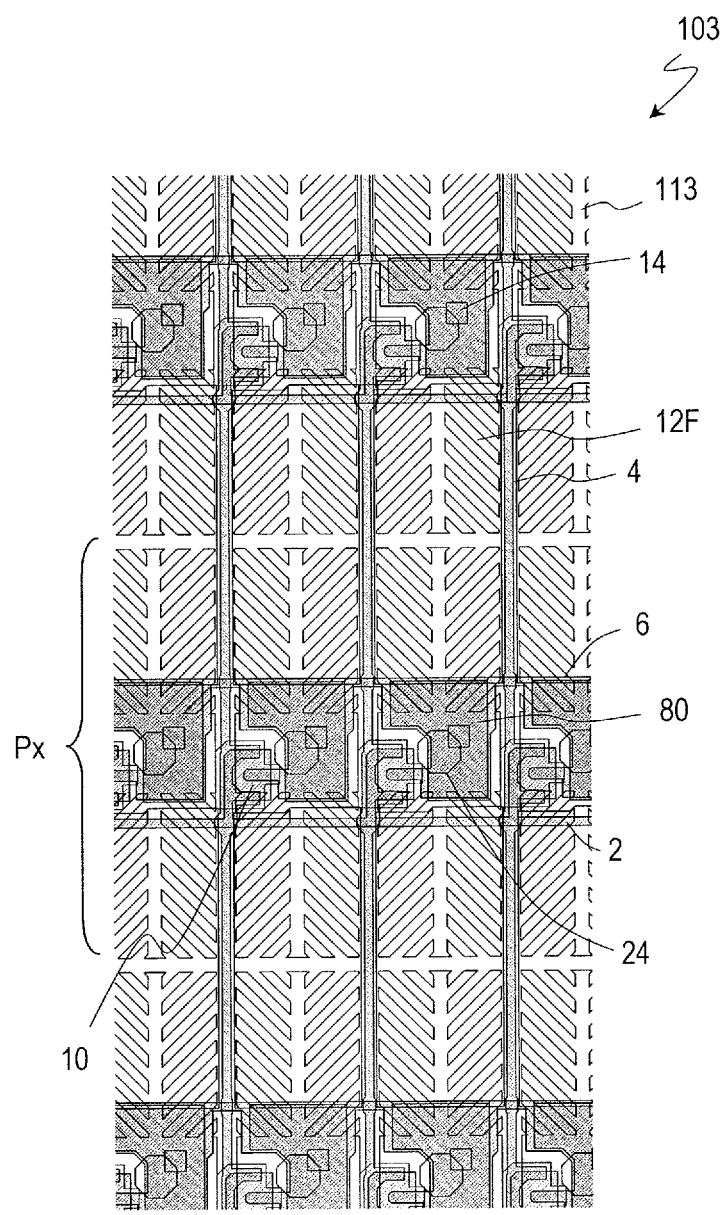
FIG. 7 is a plan view showing the configuration of a liquid crystal display device according to Embodiment 3 of the present invention.

FIG. 7 shows a liquid crystal display device 103 in Embodiment 3. The liquid crystal display device 103 is different from the liquid crystal display device 100 of Embodiment 1 in that the liquid crystal display device 103 includes a fishbone-shaped pixel electrode 12F on a TFT substrate 113. The same components as those in Embodiment 1 or 2 are designated by the same reference numerals, and the descriptions thereof are omitted.

Such a liquid crystal display device including the fishbone-shaped pixel electrode is described, for example, in International Publication No. WO 2011/096390 by the applicant of the present invention, the entire contents of which are incorporated by reference herein.

In this embodiment, in order to improve the response speed of liquid crystal orientation in voltage application, PSA (Polymer Sustained Alignment) technique may be used. The PSA technique is a technique in which an orientation maintaining layer for applying pre-tilt to liquid crystal in no voltage application is formed. The orientation maintaining layer is formed as a polymer layer in the following manner. After a liquid crystal cell is formed, a photo-polymerizable monomer which is previously mixed in a liquid crystal material is photo-polymerized typically in the condition where a voltage is applied across the liquid crystal layer. By the orientation maintaining layer, the liquid crystal in no voltage application can be maintained (memorized) to have a pre-tilt angle in a direction slightly inclined (e.g., 2° to 3°) from the direction perpendicular to the substrate surface and the orientation direction.

The PSA technique can be applied to Embodiment 1 or the like in addition to the combination with the fishbone-shaped pixel electrode, thereby attaining the effect of the increase in response speed.

Figure 8:
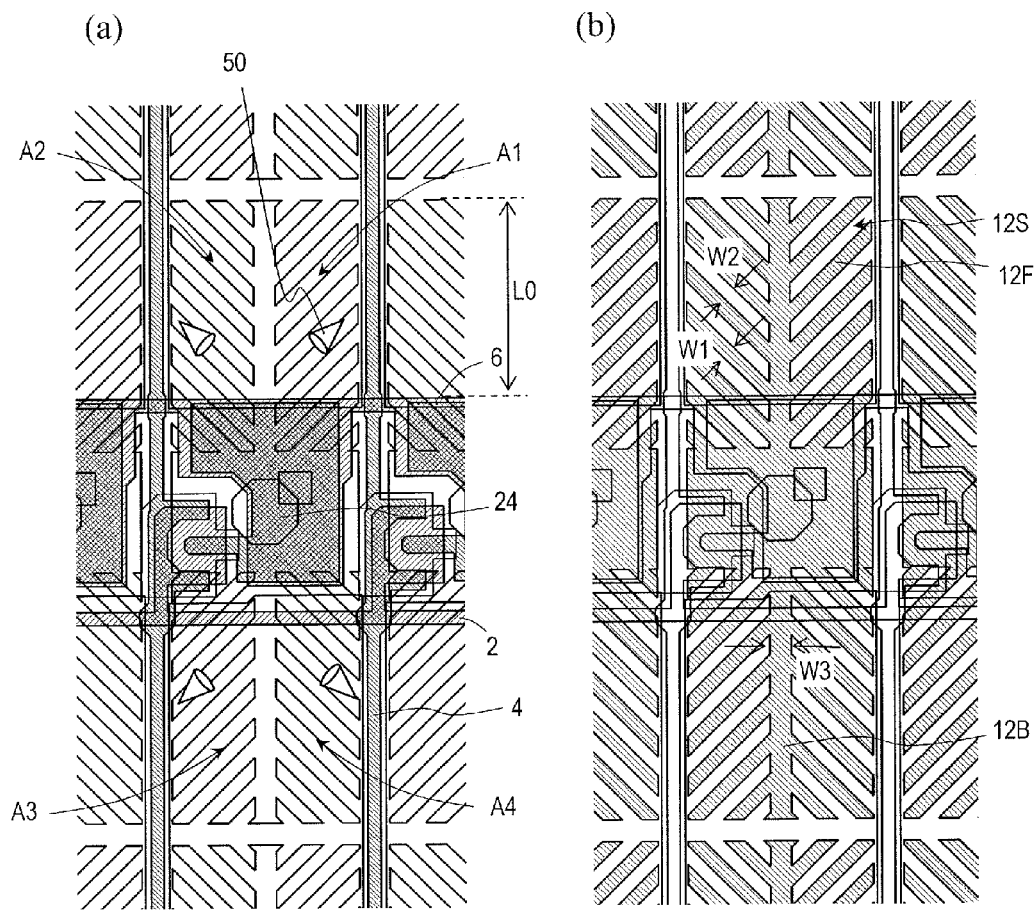
FIG. 8 is an enlarged view showing the center portion of a pixel in the liquid crystal display device shown in FIG. 7, in which (a) emphatically shows a gate layer and a source/drain layer, and (b) emphatically shows a fishbone-shaped pixel electrode.

FIG. 8(a) and FIG. 8(b) show the vicinity of the center portion of one pixel region in FIG. 7 in an enlarged manner. FIG. 8(a) emphatically shows a gate layer including a storage capacitor electrode and a source/drain layer including a storage capacitor counter electrode. FIG. 8(b) emphatically shows a fishbone-shaped pixel electrode 12F. In this specification, the gate layer includes a gate bus line, a gate electrode, a storage capacitor bus line, and a storage capacitor electrode. The source/drain layer includes a source bus line, a source electrode, a drain electrode, and a storage capacitor counter electrode.

In the fishbone-shaped pixel electrode 12F, for example, as shown in the figure, branch minute electrodes having a width (w1) of about 3.4 μm are disposed with an interval (w2) of about 3.2 μm, thereby forming a slit 12S. The fishbone-shaped pixel electrode 12F has a backbone portion 12B (a stem portion) extending in the center of the pixel region in parallel to the source bus line 4, and a plurality of minute electrodes extending in directions which are different from each other are connected to the backbone portion 12B. The backbone portion 12B has, for example, a width (w3) of about 5 μm. As described above, in this embodiment, minute electrodes (minute slits) are formed so that one pixel is roughly divided into four orientation regions (domains) A1 to A4.

When a voltage is applied between the pixel electrode 12F and the counter electrode, in each domain, liquid crystal molecules 50 are oriented so as to be parallel to the direction in which the slit 12S extends and so that upper end portions of the liquid crystal molecules 50 (end portions on the side of a common electrode) are tilted toward the inside of the pixel.

In this embodiment, the columnar spacer 24 has a planar shape of regular octagon or the like with four sides perpendicular to respective orientation directions (azimuth angles of 45°, 135°, 225°, 315°) of liquid crystal molecules in the respective domains A1 to A4. In addition, the columnar spacer 24 has a frustum shape in which an angle formed by the surface of the counter substrate and the side face of the columnar spacer 24 is smaller than 90 degrees. Since a vertical alignment film is also formed on the side face of the columnar spacer 24, the orientation regulating force to the liquid crystal molecules 50 works by means of the columnar spacer 24. The direction of the orientation regulation (the direction in which the liquid crystal molecules 50 are to be tilted) is the direction perpendicular to the side face of the columnar spacer 24.

As shown in FIG. 8(a), the liquid crystal molecules 50 in the domains A1 to A4 around the columnar spacer 24 are intended to be oriented toward the columnar spacer 24, but the side face of the columnar spacer 24 has a face perpendicular to the orientation direction. Thus, the direction of orientation regulation by the columnar spacer 24 agrees with the direction of orientation regulation by the domains A1 to A4 (or the directions are closer to each other). In addition, the orientation direction of a boundary region between the domains A1 to A4 (i.e. the liquid crystal molecules on the backbone portion 12B) in which the orientation direction of the liquid crystal molecules 50 is unstable can be oriented toward the columnar spacer 24. Accordingly, it is possible to obtain display with good transmittance, contrast ratio, or viewing angle characteristics in which the alignment disorder hardly occurs. In addition, a defect in which transmittances of respective domains are different is reduced, so that it is possible to provide high quality display in which the occurrence of roughness or the like is avoided. As described above, in the case where a plurality of domains are defined around the center of the pixel region by the fishbone-shaped pixel electrode 12F, a columnar spacer 24 is preferably disposed in the center of the pixel region, whereby the alignment disorder is hard to occur.

Preferably, the orientation directions of liquid crystal molecules in the respective domains A1 to A4 form an angle of 45° with respect to the polarizing axes (the three-o'clock to nine-o'clock direction and the twelve-o'clock to six-o'clock direction) of the polarizing plate disposed on the outside of the liquid crystal panel.

Figure 9:
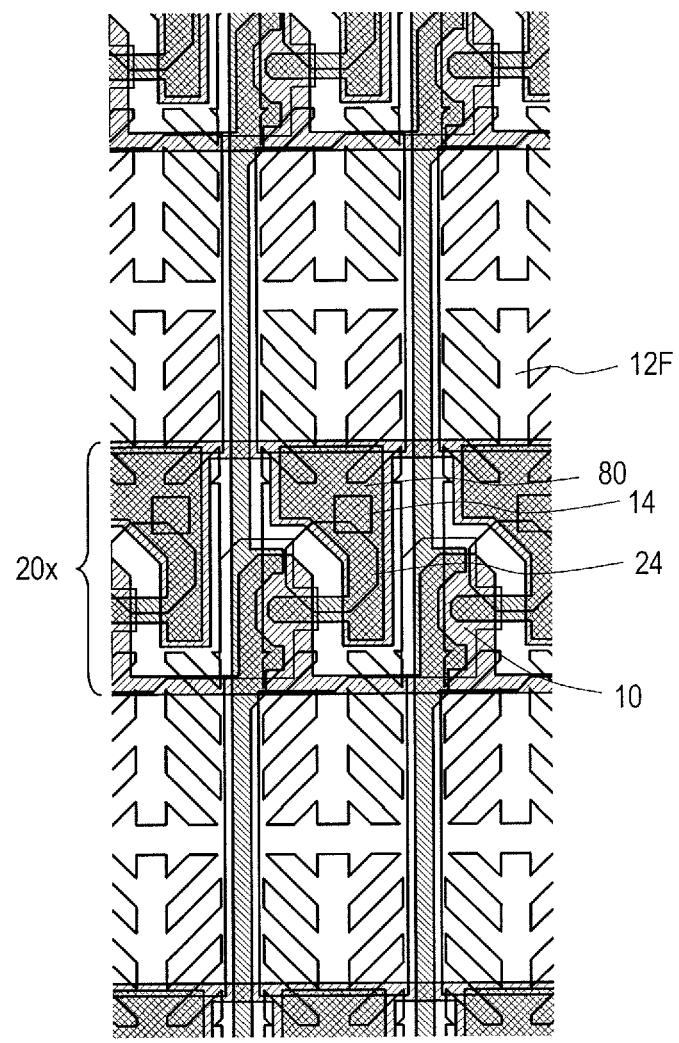
FIG. 9 is a plan view showing the configuration of a liquid crystal display device in a modified embodiment of Embodiment 3, and showing the case of a smaller pixel size.

FIG. 9 shows the case in which the present invention is applied to the wide XGA system (1280×RGB×800 pixels, and the diagonal of about 5.35 inches) having the pixel size of 30 μm×90 μm. In accordance with the minimum line width defined by the limits in the production process or the like, the shapes of the pixel electrode and the storage capacitor portion are different from those in the liquid crystal display device 103 shown in FIG. 7 and FIG. 8, but the display apparatus can operate similarly to the liquid crystal display device 103.

As described above, if the orientation direction of liquid crystal molecules promoted by the slits of the pixel electrode is similar to the orientation direction of liquid crystal molecules promoted by the columnar spacer, as in this embodiment, the liquid crystal molecules can be more surely maintained in the desired orientation, when the PSA processing is performed, thereby suppressing the occurrence of roughness and irregularity. In addition, the response speed can be improved, so that the abnormal alignment caused when the liquid crystal panel surface is pressed by a finger or the like can be returned to the normal alignment earlier. For example, it is suitable for the case where the touch panel or the like is set on the surface of the liquid crystal panel.

Embodiment 4

Figure 10:
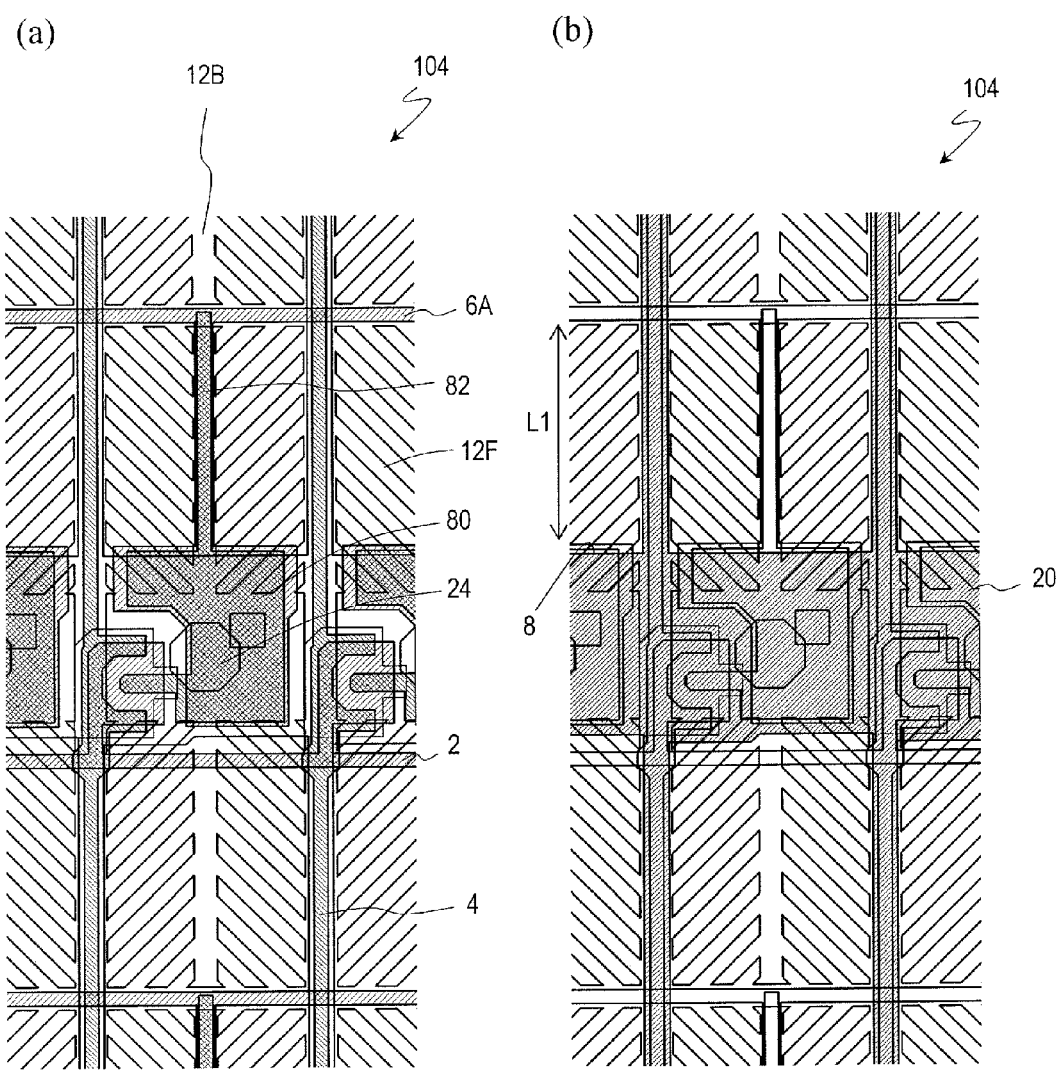
FIG. 10 is a plan view showing the configuration of a liquid crystal display device according to Embodiment 4 of the present invention, in which (a) emphatically shows a gate layer and a source/drain layer, and (b) emphatically shows a BM.

FIG. 10(a) and FIG. 10(b) show a liquid crystal display device 104 of Embodiment 4. FIG. 10(a) emphatically shows a gate layer and a source/drain layer, and FIG. 10(b) emphatically shows a BM 20. In Embodiment 4, in the configuration utilizing the fishbone-shaped pixel electrode 12F in Embodiment 3, an additional storage capacitor portion 82 is formed in a region corresponding to the backbone portion 12B of the fishbone-shaped pixel electrode 12F. The same components as those in Embodiments 1 to 3 are designated by the same reference numerals, and the descriptions thereof are omitted.

In this embodiment, a Cs bus line 6A is located in a space between the fishbone-shaped pixel electrodes 12F which are vertically adjacent to each other in the figure, and the Cs capacitor portion 82 is additionally disposed in the backbone portion 12B of the fishbone-shaped pixel electrode 12F. The Cs capacitor portion 82 is constituted by a Cs line (a Cs electrode) extending from the Cs bus line 6A, an insulating film provided thereon, and a Cs counter electrode provided thereon as an additional portion extending from the Cs counter electrode 16 shown in Embodiment 3 or the like.

To the Cs bus line 6A, via the Cs line which overlaps with the backbone portion 12B (the Cs electrode which constitutes the above-mentioned Cs capacitor portion 82), a storage capacitor electrode 8 provided in the pixel center portion (the region in which the columnar spacer 24 is disposed) is connected. Similarly to Embodiment 3, the storage capacitor portion 80 positioned in the pixel center is also formed.

The backbone portion 12B of the fishbone-shaped pixel electrode 12F is positioned on the boundary between the regions (domains) having different liquid crystal orientations, and is the portion of which the contribution to display is low. For example, even when a voltage of white display is applied, the boundary portion often becomes a dark line. In addition, the orientation regulating force by the slits is weak, so that the alignment disorder may easily occur. This embodiment has the configuration in which the Cs capacitor portion is added to the region, so that the storage capacitor can be increased while the degradation of display quality is suppressed.

The space portion between fishbone-shaped pixel electrodes 12F which are vertically adjacent to each other in the figure is also a portion of which the contribution to display is low, so that the Cs bus line 6A is disposed in this portion. As described above, the Cs capacitor portion 82 is formed in the region Cs of which the contribution to display is low, so that the degradation of display quality can be prevented. By the provision of the Cs capacitor portion 82, even when the size of the Cs capacitor portion 80 in the center portion of the pixel electrode is made smaller, it is possible to ensure sufficient Cs capacitance.

Figure 11:
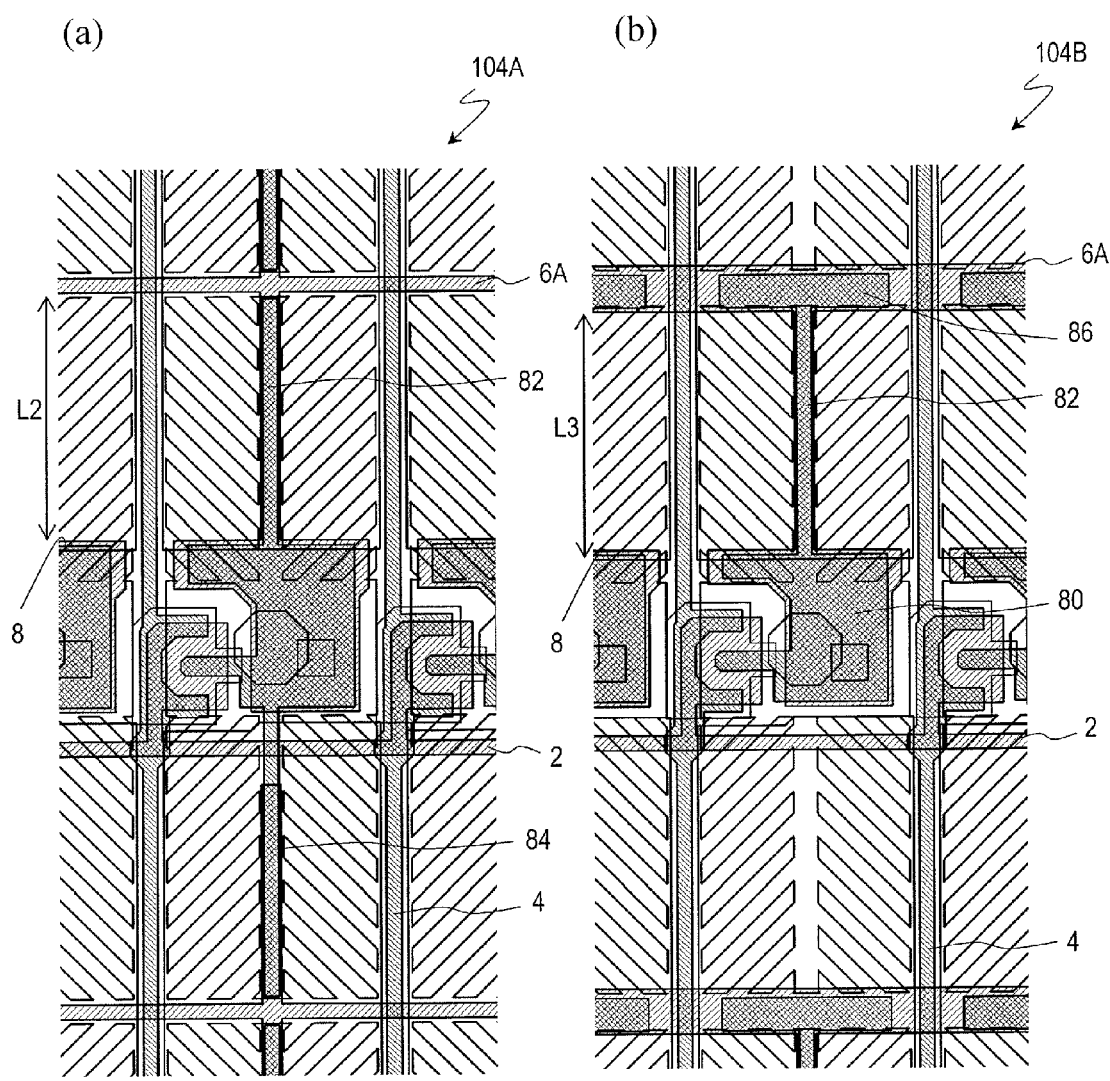
FIG. 11 is a plan view showing the configuration of a liquid crystal display device in a modified embodiment of Embodiment 4, in which (a) and (b) show different modified embodiments, respectively.

FIG. 11(a) shows a liquid crystal display device 104A in a modified embodiment of Embodiment 4. In this modified embodiment, the additional Cs capacitor portion 84 is also formed on the lower side with the columnar spacer 24 sandwiched therebetween. With such a configuration, Cs capacitance can be increased. Alternatively, the aperture ratio can be improved while the Cs capacitance is maintained to the same extent.

FIG. 11(b) shows a liquid crystal display device 104B in another modified embodiment of Embodiment 4. In this another modified embodiment, the additional Cs capacitor 86 is also formed on the Cs bus line 6A. With such a configuration, the Cs capacitance can be increased. Alternatively, the aperture ratio can be improved while the Cs capacitance is maintained to the same extent.

In Embodiment 3 shown in FIG. 8(a), the distance L0 from the edge of the pixel electrode 12 to the Cs bus line 6 (corresponding to the size of the display area) is set to be 46.25 μm, for example. On the other hand, in the liquid crystal display device 104 shown in FIG. 10(a) and FIG. 10(b), the distance L1 from the edge of the pixel electrode 12 to the Cs electrode 8 can be set to be 48.25 μm. In the liquid crystal display device 104A shown in FIG. 11(a), the distance L2 from the edge of the pixel electrode 12 to the Cs electrode 8 can be set to be 50.25 μm. In the liquid crystal display device 104B shown in FIG. 11(b), the distance L3 from the Cs bus line 6A to the Cs electrode 8 can be set to be 49.5 μm.

According to this embodiment, while the Cs capacitance can be ensured to the same extent as in Embodiment 3, the region which contributes to display in one pixel can be increased. The region for which the orientation regulation is weak and of which the contribution to display is low, such as the region between pixels vertically adjacent to each other is light-shielded, so that display defect such as that roughness or the like is visually recognized can be suppressed. Also by the columnar spacer in this embodiment, similarly to Embodiment 3, the effects such as the improvement in response speed can be attained by utilizing the orientation regulating force of the columnar spacer.

Embodiment 5

Figure 12:
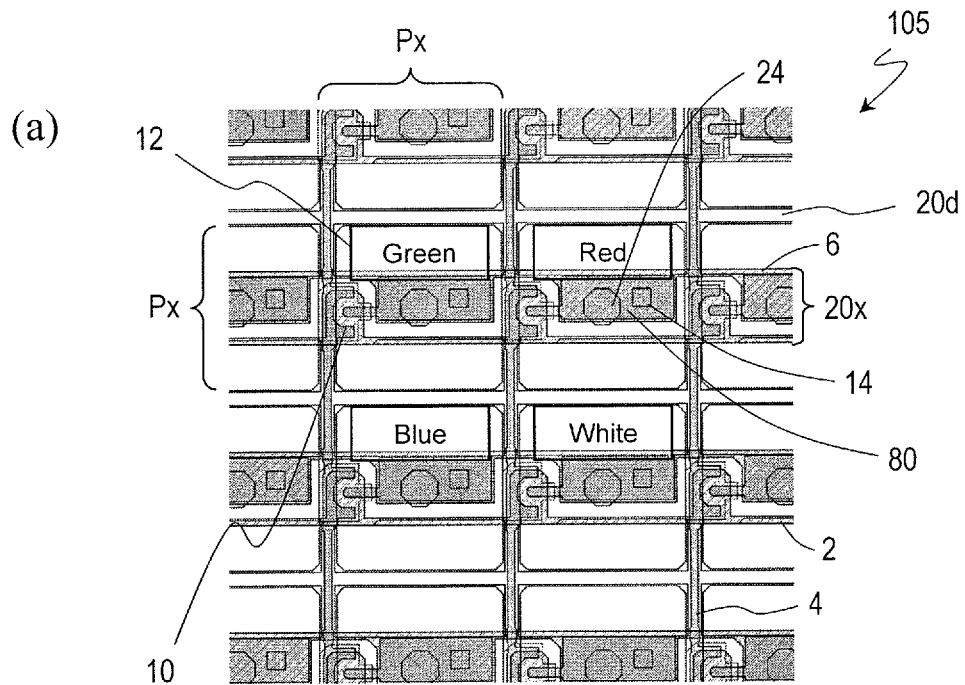
FIG. 12 is a plan view showing the configuration of a liquid crystal display device according to Embodiment 5 of the present invention, in which (a) shows the configuration for operating in a CPA mode, and (b) shows the configuration for operating in an MVA mode.
Figure 12:
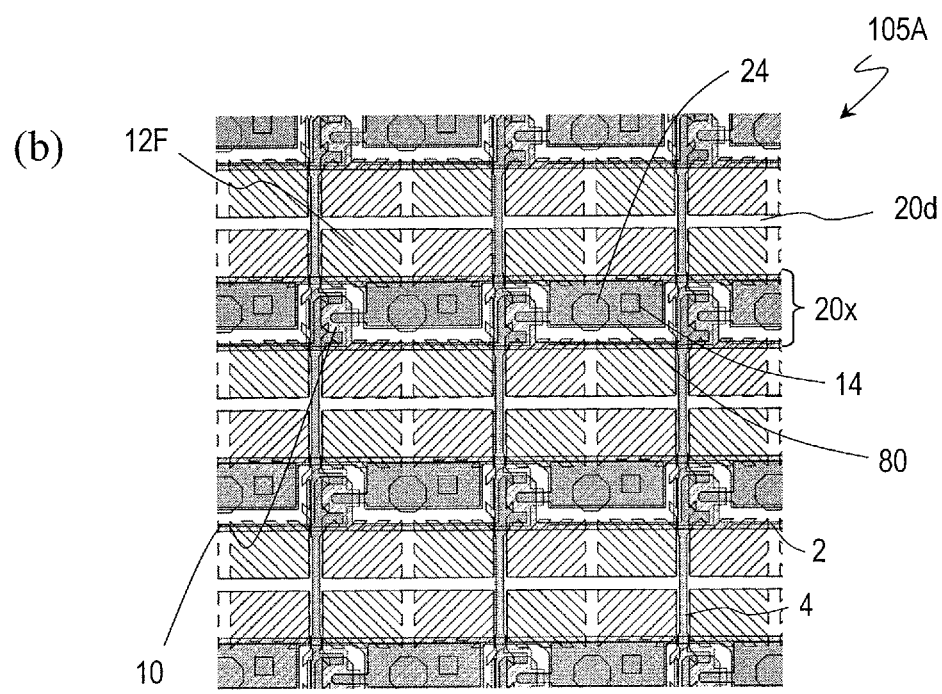
Figure 13:
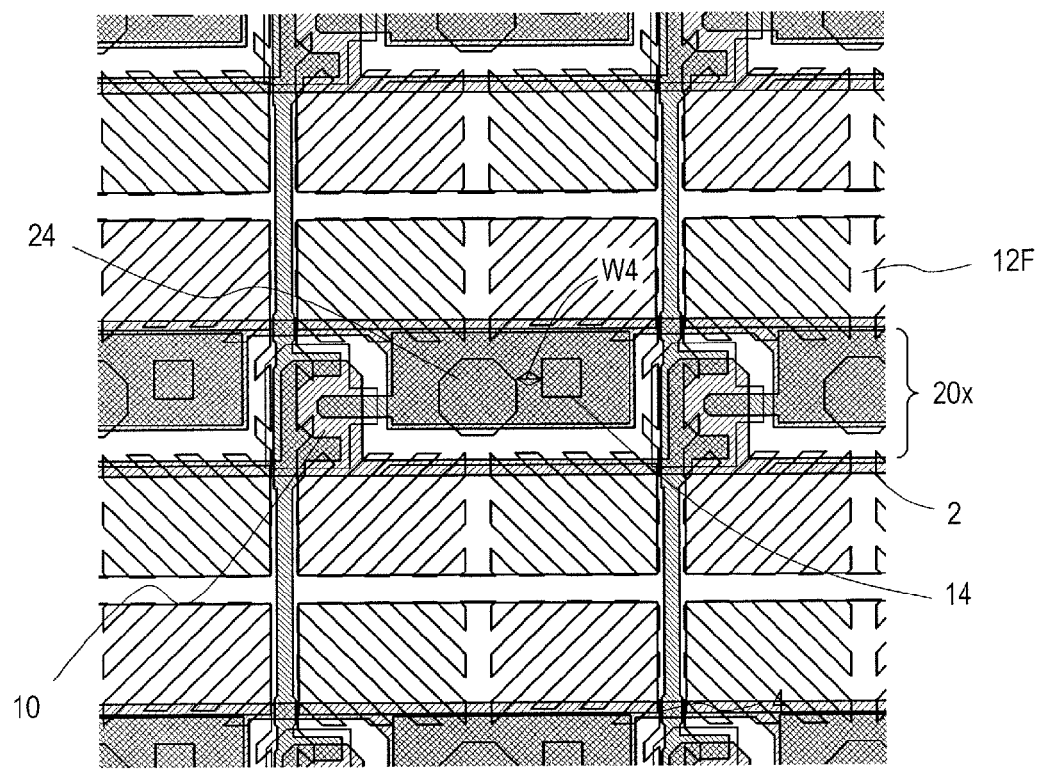
FIG. 13 is an enlarged view showing the center portion of a pixel in the liquid crystal display device shown in FIG. 12(b).

FIG. 12(a) shows a liquid crystal display device 105 in Embodiment 5. FIG. 12(b) shows a liquid crystal display device 105A in a modified embodiment of Embodiment 5 in which a fishbone-shaped electrode is used. FIG. 13 shows the center portion of a pixel region in the liquid crystal display device 105A shown in FIG. 12(b) in an enlarged manner. The same components as those in Embodiments 1 to 4 are designated by the same reference numerals, and the descriptions thereof are omitted.

This embodiment describes the configuration in which Embodiment 1 and Embodiment 3 are applied to a pixel having substantially square shape. For example, this embodiment is suitable for the case where color filters of four colors (RGB+White, RGB+Yellow, or the like) are used, or the case of monochrome display with no color filters. In this embodiment, the pixel size is set to be, for example, 75 µm×75 µm.

FIG. 12(a) illustrates the configuration in which four color pixels of RGB+White are arranged, but the arrangement of the respective colors is not limited to the shown one.

In this embodiment, as the result of the correspondence with square pixels, the contact hole and the columnar spacer do not overlap with each other. These are separately disposed with a distance, and the distance W4 (see FIG. 13) is set to be 5 µm, for example.

A BM 20d (the width thereof is 5.5 µm in this embodiment) is provided also in the space between pixel electrodes vertically adjacent to each other in the figure. This is provided for the purpose of preventing the colors from being mixed in the vertical direction in the case of four color filters. In the case of no color filters, it is unnecessary to provide the BM 20d.

Figure 14:
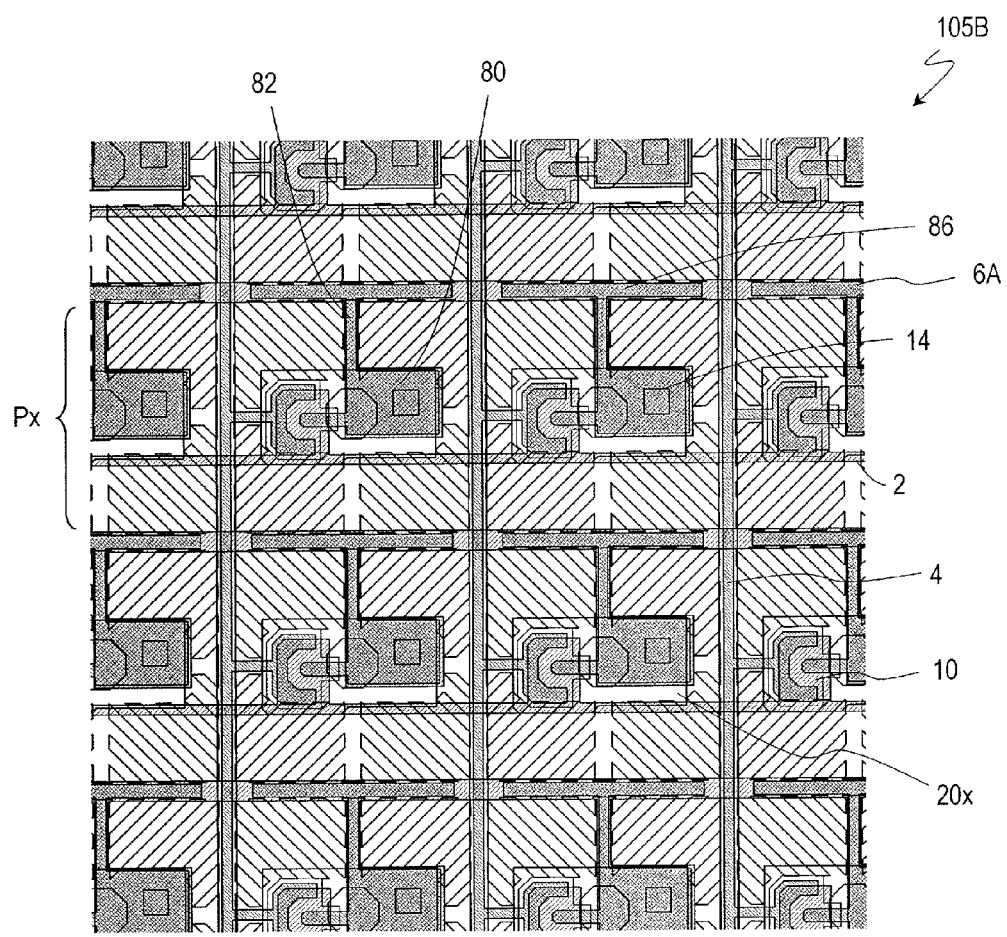
FIG. 14 is a plan view showing the configuration of a liquid crystal display device in a modified embodiment of Embodiment 5.

As a further modified example, FIG. 14 shows a liquid crystal display device 105B in the case where the modified embodiment of Embodiment 4 shown in FIG. 11(b) is adapted to square pixels. In a position corresponding to the gap portion, BM 20d, which is disposed between pixel electrodes vertically adjacent to each other in the case of four color filters, an additional Cs capacitor portion 86 is provided. As a result, the aperture ratio can be improved while the storage capacitance is adequately obtained.

Embodiment 6

Figure 15:
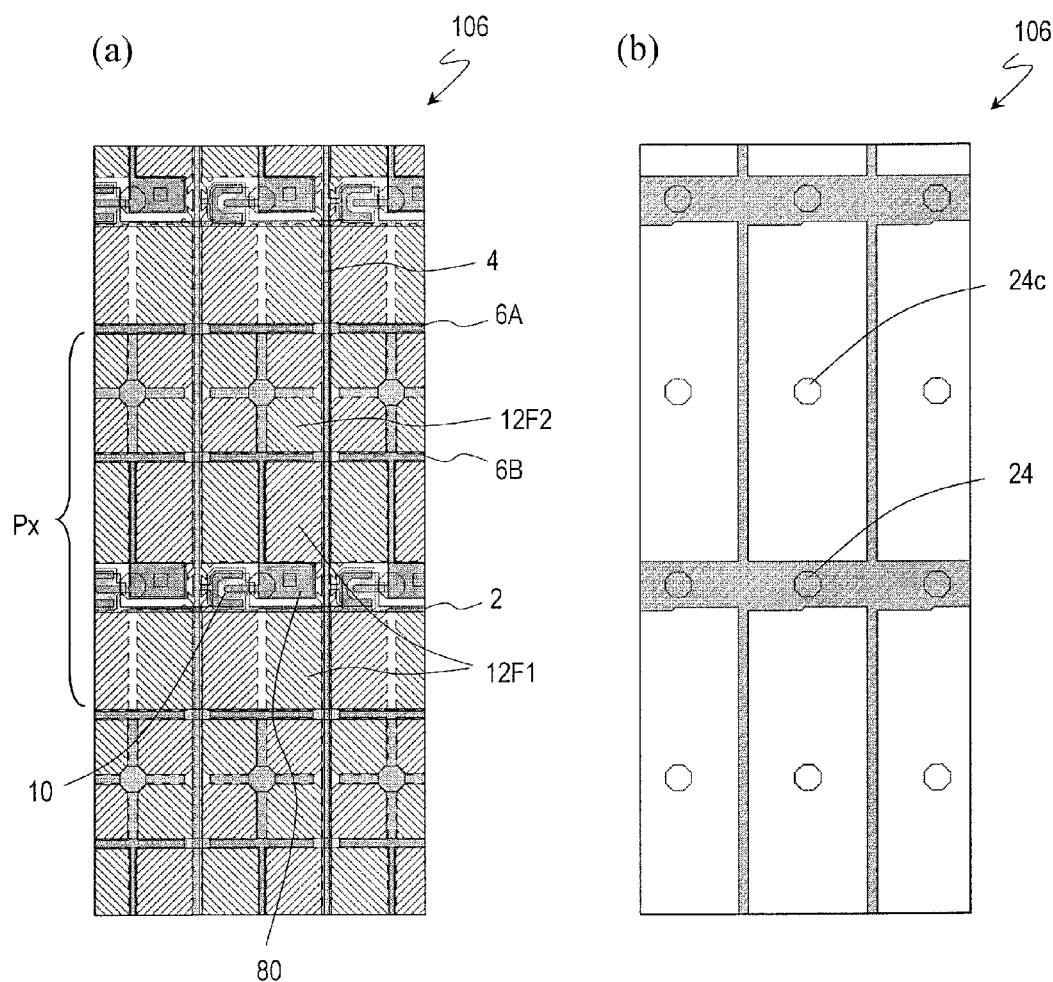
FIG. 15 is a plan view showing the configuration of a liquid crystal display device according to Embodiment 6 of the present invention, in which (a) emphatically shows a gate layer and a source/drain layer, and (b) emphatically shows the components on a counter substrate.

FIG. 15(a) and FIG. 15(b) show a liquid crystal display device 106 in Embodiment 6. FIG. 16 shows a pixel region in the liquid crystal display device 106 shown in FIG. 15 in an enlarged manner. The same components as those in Embodiments 1 to 5 are designated by the same reference numerals, and the descriptions thereof are omitted.

The liquid crystal display device 106 includes, in the pixel region, in addition to a main pixel electrode 12F1 directly connected to a TFT 10, a sub pixel electrode 12F2 connected to the TFT 10 via a coupling capacitor (not directly connected electrically, and in a floating condition). To the main pixel electrode 12F1, a predetermined voltage is applied based on a signal from a source bus line 4. On the other hand, to the sub pixel electrode 12F2 connected via the coupling capacitor, a voltage different from the voltage applied to the main pixel electrode 12F1 is applied. Accordingly, in one pixel region, two pixel regions Px1 and Px2 having different orientation conditions are provided.

The above-described configuration in which a plurality of pixel regions Px1 and Px2 with different orientations are provided in one pixel is referred to as a multi-pixel type, and is known as a technique for improving the viewing angle characteristics. The size of a pixel including the pixel regions Px1 and Px2 is 75 µm×225 µm. As shown in the figure, both of the pixel electrodes 12F1 and 12F2 are of the fishbone type which is similar to Embodiment 3.

In the configuration of this embodiment, in the main pixel region Px1, the same configurations as descried in Embodiments 1 to 4 can be adopted. A columnar spacer 24 is provided in the center portion of a main pixel electrode 12F1, and a rivet 24c is provided in the center portion of a sub pixel electrode 12F2. The rivet 24c regulates the orientation of liquid crystal molecules 50 in the sub pixel region Px2.

The coupling capacitor of the sub pixel electrode 12F2 is formed in an overlap portion (the cross shape) between the backbone portion of the sub pixel electrode 12F2 and the extended portion 18 of the drain electrode of the TFT with an insulating film sandwiched therebetween. Two Cs bus lines 6A and 6B are disposed between adjacent gate bus lines 2, and they are disposed, respectively, in spaces between the main pixel electrodes 12F1 and the sub pixel electrodes 12F2 vertically adjacent to each other. In this embodiment, similarly to the configuration shown in FIG. 11(b) and the like, the Cs capacitor portion 86 is also formed on the Cs bus line.

Such a multi-pixel configuration is suitably utilized, for example, in television, digital signage, or the like. The display quality can be improved especially when viewed from the diagonal direction.

Embodiment 7

Figure 17:
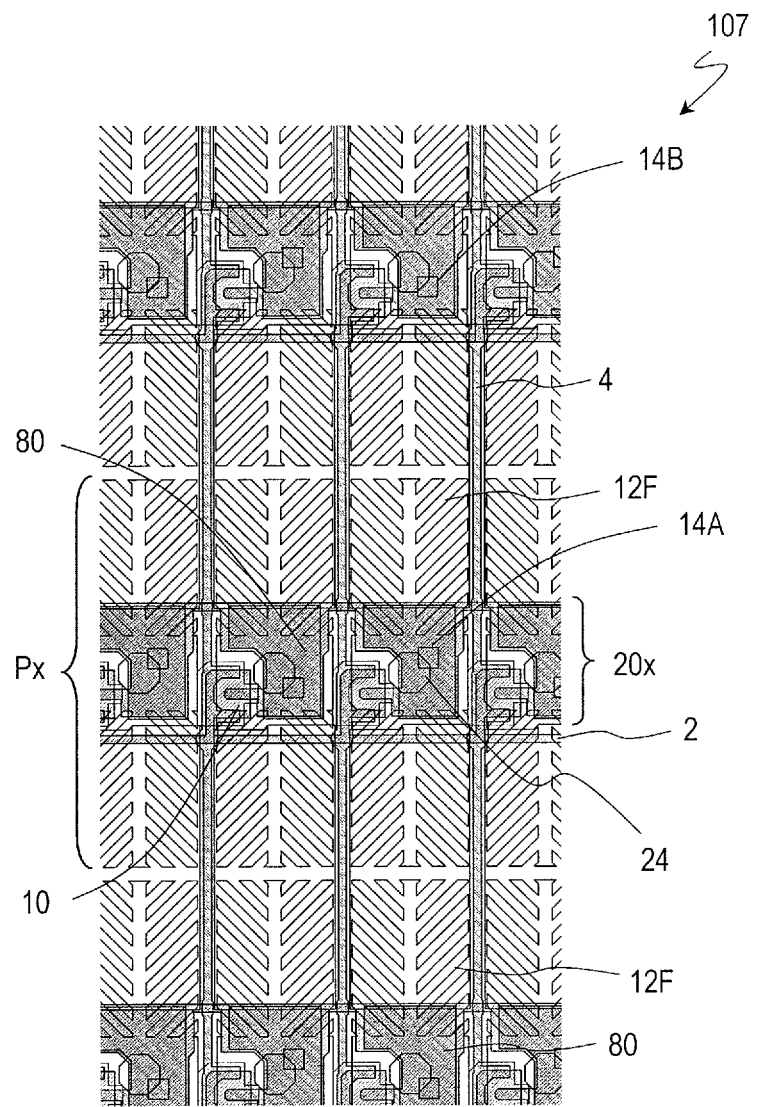
FIG. 17 is a plan view showing the configuration of a liquid crystal display device according to Embodiment 7 of the present invention.

FIG. 17 shows a liquid crystal display device 107 in Embodiment 7. This embodiment is different from Embodiment 3 in the arrangement of contact holes 14A and 14B. In this embodiment, the positional relationship of the contact holes 14A and 14B with respect to the columnar spacer 24 is different between pixels. In this embodiment, there are two kinds of positions of the contact holes 14A and 14B. The same components as those in Embodiment 1 to 6 are designated by the same reference numerals, and the descriptions thereof are omitted.

In the step of sticking the counter substrate to the TFT substrate, there may occur any positional deviation between them (for example, about 5 µm). When a columnar spacer and a sub columnar spacer are to be formed on the counter substrate, any positional deviation with respect to the counter electrode by several micrometers may occur.

In the case where the positional relationships between the columnar spacers and the contact holes are the same in all of the pixels, if the positional deviation occurs in one specific direction, the contact area of the columnar spacer with the TFT substrate is easily varied largely. On the other hand, if a plurality of positional relationships are provided as described above, it is possible to prevent the contact area from being varied between products produced in mass production. When the plurality of positional relationships are set, it is desired that the respective numbers of contact holes 14A and 14B having different positional relationships are equally set in the display area. In addition, it is desired that the contact holes 14A and 14B may be provided in such a manner that the respective contact holes 14A and 14B having predetermined positional relationships be uniformly disposed in the display area.

Herein, the configuration in which the positions of the contact holes are changed in the modified embodiment of Embodiment 3 is described, but the configuration can be applied in the other embodiments.

The embodiments of the prevent invention are described above, but other various kinds of configurations can be adopted. For example, the present invention can be applied to the case where pixels are arranged in a delta array. Alternatively, the present invention can be applied to a semi-transmission type liquid crystal display device by providing a reflective electrode around a pixel electrode.

INDUSTRIAL APPLICABILITY

The present invention can be widely used in liquid crystal display devices of various applications. The present invention can be suitably utilized as a small-sized and high-definition liquid crystal display device of VA mode which is provided in an electronic book, a smart phone, or the like, for example.

REFERENCE SIGNS LIST

100 Liquid crystal display device
110 TFT substrate

120 Counter substrate
2 Gate bus line
4 Source bus line
6 Storage capacitor bus line
8 Storage capacitor electrode
10 TFT
12 Pixel electrode
14 Contact hole
16 Storage capacitor counter electrode
20 Black matrix
22 Opening portion
24 Columnar spacer
80 Storage capacitor forming region (Storage capacitor portion)
Px Pixel region

The invention claimed is:

1. A liquid crystal display device comprising: a thin film transistor (TFT) substrate, a counter substrate, and a vertical alignment type liquid crystal layer sandwiched between the TFT substrate and the counter substrate, wherein
the TFT substrate includes:
a first substrate;
a gate bus line provided so as to extend along a first direction on the first substrate;
a source bus line provided so as to extend along a second direction which intersects the first direction on the first substrate;
a TFT provided in the vicinity of the intersecting portion of the gate bus line and the source bus line;
an interlayer insulating layer which covers the TFT;
a pixel electrode electrically connected to the TFT via a contact hole formed in the interlayer insulating layer;
a storage capacitor bus line provided on the first substrate and a storage capacitor electrode connected to the storage capacitor bus line; and
a storage capacitor counter electrode having a light-shielding property electrically connected to the TFT and the pixel electrode, the storage capacitor counter electrode constituting a storage capacitor portion together with the storage capacitor electrode with an insulating layer interposed therebetween, and
the counter substrate includes:
a second substrate; and
a counter electrode provided on the second substrate, and wherein
the liquid crystal display device further comprises a black matrix having a light-shielding property provided on the first substrate or on the second substrate, and
a columnar spacer provided between the TFT substrate and the counter substrate, the columnar spacer being disposed in a center portion of a pixel region corresponding to the pixel electrode so as to at least partially overlap with the storage capacitor counter electrode,
the contact hole being provided so as to overlap with the storage capacitor counter electrode, and
the black matrix including a portion which integrally covers the TFT and the columnar spacer.

2. The liquid crystal display device of claim 1, wherein the source bus line is disposed so as to extend along a peripheral portion of the pixel region, and the TFT is disposed in the vicinity of the peripheral portion of the pixel region.

3. The liquid crystal display device of claim 1, wherein the columnar spacer is disposed so as to at least partially overlap with the pixel electrode.

4. The liquid crystal display device of claim 1, wherein the black matrix is disposed so as to at least partially overlap with the storage capacitor counter electrode.

5. The liquid crystal display device of claim 1, wherein the black matrix includes a first BM portion for light-shielding the TFT and a second BM portion for light-shielding the columnar spacer, the first BM portion overlapping with the second BM portion.

6. The liquid crystal display device of claim 1, wherein the contact hole and the columnar spacer are disposed so as to at least partially overlap with each other.

7. The liquid crystal display device of claim 1, wherein the orientation of liquid crystal molecules of the liquid crystal layer is radially regulated by the columnar spacer when a voltage is applied.

8. The liquid crystal display device of claim 1, wherein the pixel electrode includes a plurality of first minute electrodes extending in a third direction, a plurality of second minute electrodes extending in a fourth direction, a plurality of third minute electrodes extending in a fifth direction, and a plurality of fourth minute electrodes extending in a sixth direction, the third direction, the fourth direction, the fifth direction, and the sixth direction being mutually different.

9. The liquid crystal display device of claim 8, wherein the pixel electrode includes a backbone portion formed in a boundary portion of the first to fourth minute electrodes, and an additional storage capacitor is formed in a region corresponding to the backbone portion.

10. The liquid crystal display device of claim 1, wherein the liquid crystal display device comprises a plurality of pixel regions, and a projection structure which is lower than the columnar spacer is provided in the center portion of a pixel region which is different from the pixel region in which the columnar spacer is provided among the plurality of pixel regions.

11. The liquid crystal display device of claim 1, further comprising a sub pixel electrode disposed adjacently to the pixel electrode, and connected to the TFT via a capacitance coupling.

12. The liquid crystal display device of claim 1, wherein the liquid crystal display device comprises a plurality of pixel regions, and the position of the contact hole with respect to the columnar spacer is different between at least two pixel regions among the plurality of pixel regions.

* * * * *